(12) United States Patent
Shimada

(10) Patent No.: US 8,587,875 B2
(45) Date of Patent: Nov. 19, 2013

(54) ZOOM LENS, OPTICAL APPARATUS AND METHOD FOR MANUFACTURING ZOOM LENS

(75) Inventor: Toshiyuki Shimada, Kawasaki (JP)

(73) Assignee: Nikon Corporation, Tokyo (JP)

( * ) Notice: Subject to any disclaimer, the term of this patent is extended or adjusted under 35 U.S.C. 154(b) by 237 days.

(21) Appl. No.: 13/054,077

(22) PCT Filed: Jun. 25, 2009

(86) PCT No.: PCT/JP2009/062075
§ 371 (c)(1),
(2), (4) Date: Jan. 13, 2011

(87) PCT Pub. No.: WO2010/007892
PCT Pub. Date: Jan. 21, 2010

(65) Prior Publication Data
US 2011/0141574 A1    Jun. 16, 2011

(30) Foreign Application Priority Data

Jul. 14, 2008   (JP) .................................. 2008-182865
Nov. 12, 2008   (JP) .................................. 2008-290385

(51) Int. Cl.
*G02B 15/14* (2006.01)
(52) U.S. Cl.
USPC .......................................... 359/680; 359/689
(58) Field of Classification Search
USPC ................... 359/676, 680–682, 689
See application file for complete search history.

(56) References Cited

U.S. PATENT DOCUMENTS

| | | | |
|---|---|---|---|
| 5,835,287 A | 11/1998 | Ohtake |
| 6,545,819 B1 | 4/2003 | Nanba et al. |
| 6,862,143 B2 | 3/2005 | Hoshi et al. |
| 7,446,956 B2 | 11/2008 | Shimada |
| 7,599,126 B2 | 10/2009 | Kurioka |
| 7,675,688 B2 | 3/2010 | Shimada |
| 7,920,334 B2 | 4/2011 | Shimada |
| 2003/0133201 A1 | 7/2003 | Nanba et al. |
| 2005/0024749 A1 | 2/2005 | Nanba et al. |
| 2005/0030642 A1 | 2/2005 | Nanba et al. |
| 2005/0041303 A1 | 2/2005 | Nanba et al. |
| 2005/0200969 A1 | 9/2005 | Nose et al. |
| 2006/0072212 A1 | 4/2006 | Nanba et al. |
| 2006/0238889 A1 | 10/2006 | Nanba et al. |
| 2006/0238890 A1 | 10/2006 | Nanba et al. |
| 2007/0211350 A1 | 9/2007 | Kurioka |
| 2007/0285800 A1 | 12/2007 | Shimada |

(Continued)

FOREIGN PATENT DOCUMENTS

JP    09-146001 A    6/1997
JP    2001-66503 A    3/2001

(Continued)

OTHER PUBLICATIONS

Office Action issued Oct. 10, 2012, in Chinese Patent Application No. 200980135126.7.

*Primary Examiner* — James Greece
(74) *Attorney, Agent, or Firm* — Miles & Stockbridge P.C.

(57) ABSTRACT

A zoom lens includes, in order from an object side along an optical axis: a first lens group G1 having negative refractive power; a second lens group G2 having positive refractive power; and a third lens group G3 having positive refractive power. Upon zooming from a wide-angle end state to a telephoto end state, a distance between the first lens group G1 and the second lens group G2 varies, and a distance between the second lens group G2 and the third lens group G3 varies, and a given conditional expression is satisfied.

30 Claims, 20 Drawing Sheets

(56) References Cited

U.S. PATENT DOCUMENTS

| | | |
|---|---|---|
| 2008/0055738 A1* | 3/2008 | Chang ........................... 359/689 |
| 2009/0015940 A1 | 1/2009 | Shimada |
| 2009/0161229 A1 | 6/2009 | Shimada |

FOREIGN PATENT DOCUMENTS

| | | |
|---|---|---|
| JP | 2002-072091 A | 3/2002 |
| JP | 2002-072093 A | 3/2002 |
| JP | 2004-318097 A | 11/2004 |
| JP | 2005-258057 A | 9/2005 |
| JP | 2006-139187 A | 6/2006 |
| JP | 2006-208890 A | 8/2006 |
| JP | 2006-208890 A | 10/2006 |
| JP | 2007-272216 A | 10/2007 |
| JP | 2007-272216 A | 10/2007 |
| JP | 2009-020337 A | 1/2009 |
| JP | 2009-156905 A | 7/2009 |
| JP | 2007-333799 A | 12/2009 |

* cited by examiner

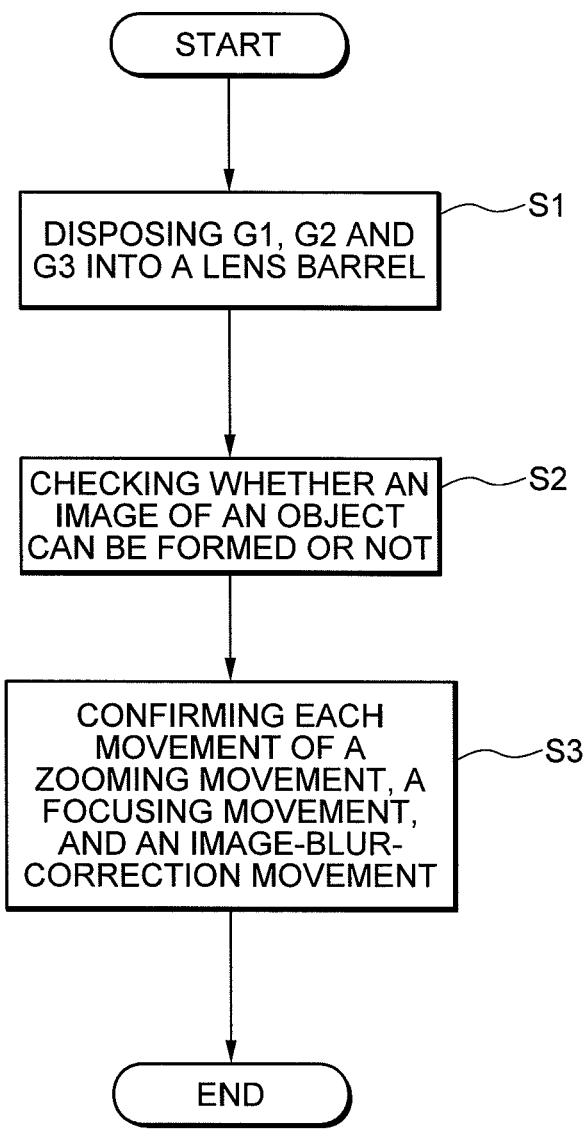

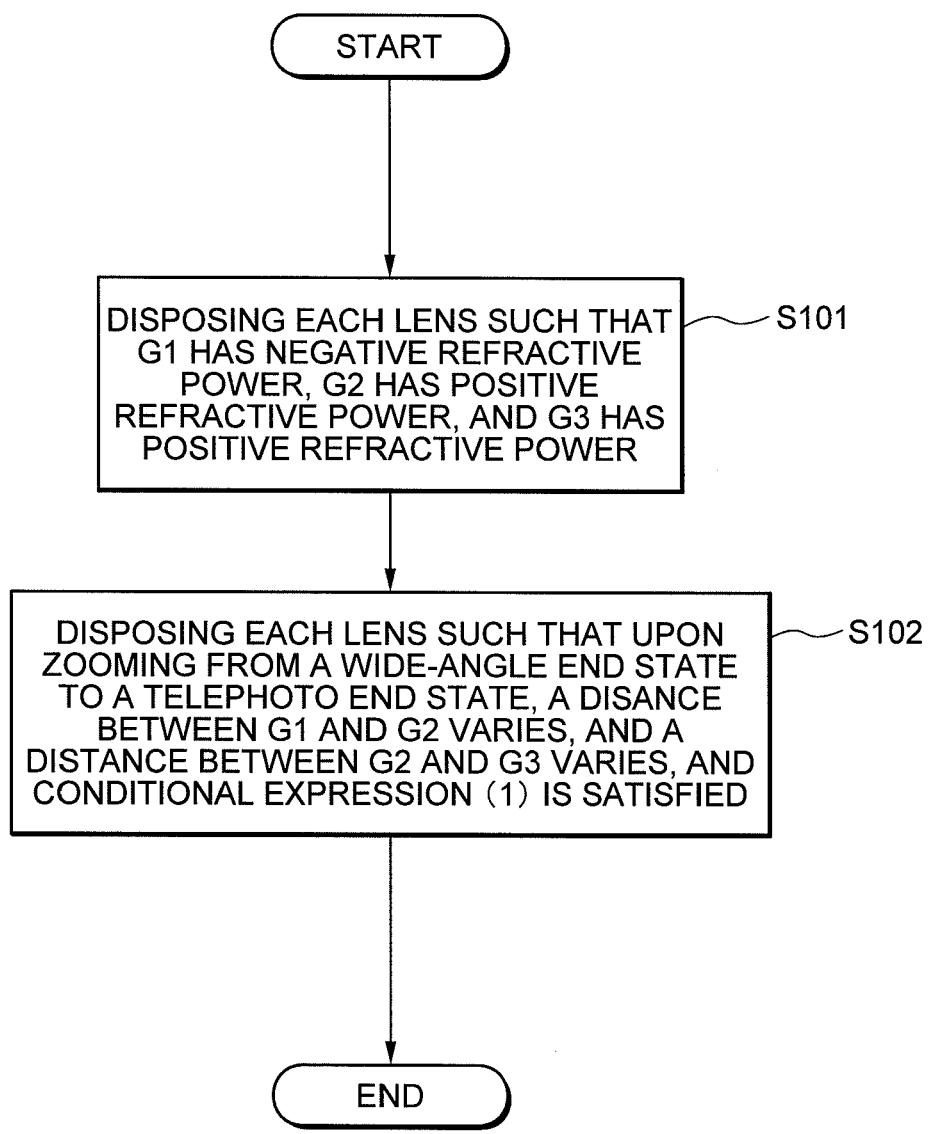

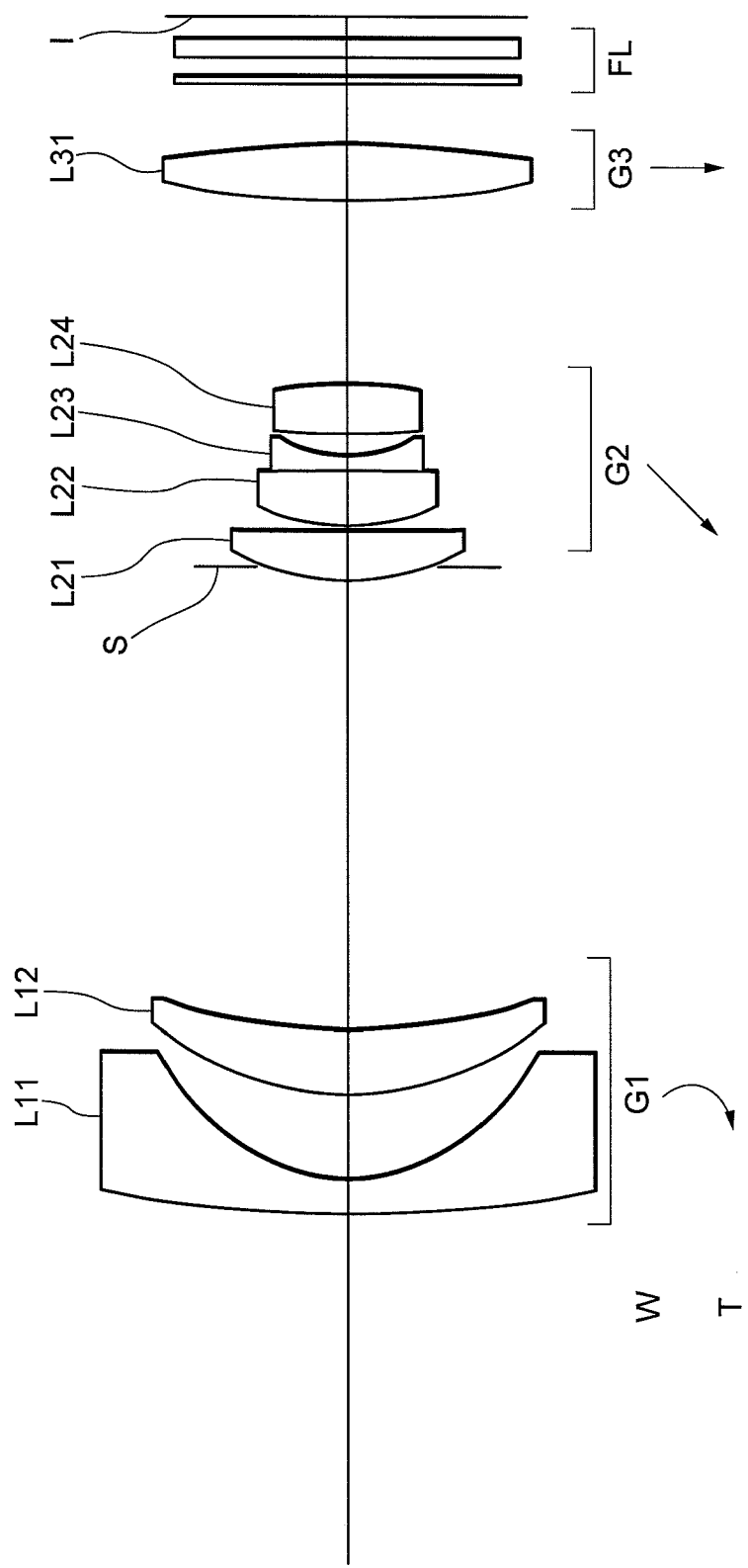

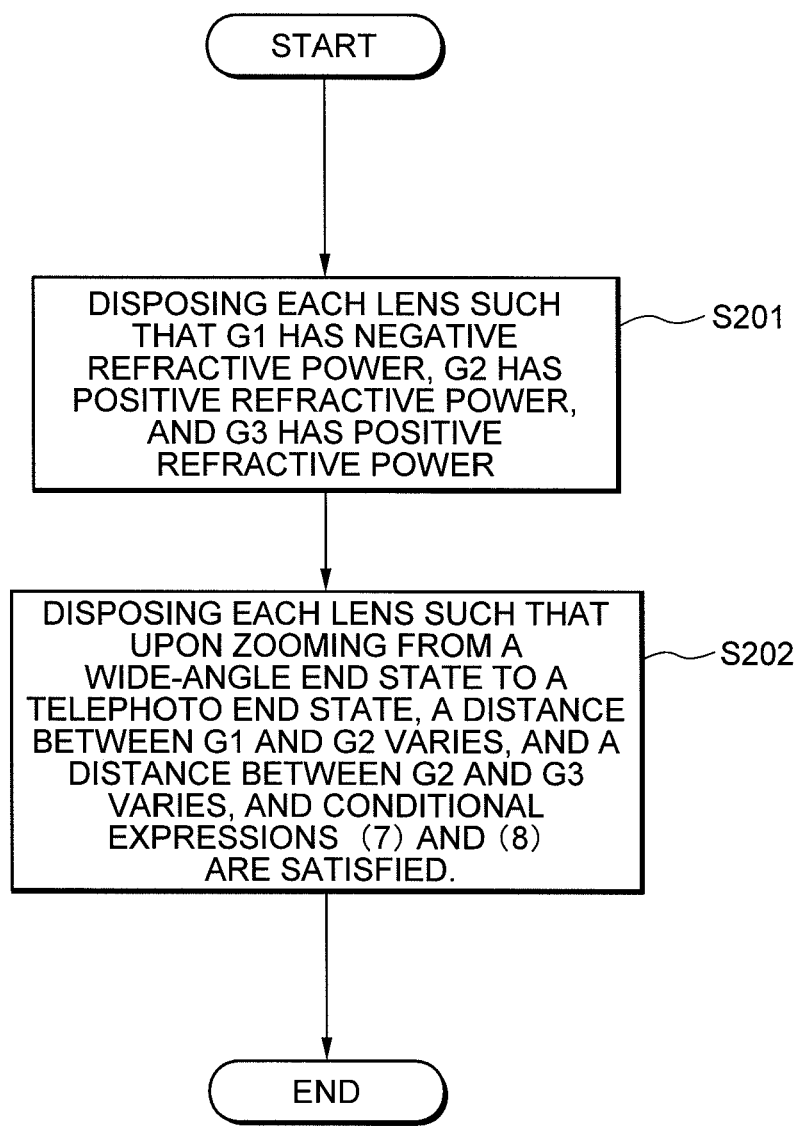

ZOOM LENS, OPTICAL APPARATUS AND METHOD FOR MANUFACTURING ZOOM LENS

TECHNICAL FIELD

The present invention relates to a zoom lens, an optical apparatus and a method for manufacturing the zoom lens.

BACKGROUND ART

Recently, in an imaging apparatus (camera) such as a digital still camera, a digital video camera, and the like using a solid-state imaging device, the trend of downsizing and high performance has been rapidly progressing. In such an optical apparatus, a zoom lens is generally used as an imaging lens, so that a photographer can easily take a picture with an optimum angle of view in optimum conditions for shooting. In such zoom lenses, there has been a strong request for a wider angle of view and a higher zoom ratio. For example, zoom lenses having an angle of view in the wide-angle end state of 70 or 80 degrees or more capable of taking a sufficient telephotograph are disclosed in example 2 of Japanese Patent Application Laid-Open No. 2007-272216 and in example 2 of Japanese Patent Application Laid-Open No. 2006-208890.

DISCLOSURE OF THE INVENTION

However, these conventional zoom lenses have not sufficiently corrected aberrations, so that excellent optical performance has not been able to be obtained.

The present invention is made in view of the above-described problem. According to a first invention, there is provided a zoom lens comprising, in order from an object side along an optical axis: a first lens group having negative refractive power; a second lens group having positive refractive power; and a third lens group having positive refractive power; upon zooming from a wide-angle end state to a telephoto end state, a distance between the first lens group and the second lens group varying, and a distance between the second lens group and the third lens group varying, and the following conditional expression being satisfied:

$$2.4 < (ft^2 \times Dw23)/(fw^2 \times TLw) < 4.0$$

where fw denotes a focal length of the zoom lens in a wide-angle end state, Dw23 denotes a distance between the second lens group and the third lens group in the wide-angle end state, ft denotes a focal length of the zoom lens in the telephoto end state, and TLw denotes a total lens length of the zoom lens in the wide-angle end state.

In the first invention, there is provided an optical apparatus equipped with the zoom lens according to the first invention that forms a given image of the object.

In the first invention, there is provided a method for manufacturing a zoom lens including a first lens group, a second lens group, and a third lens group, comprising steps of: disposing each lens in such a manner that the first lens group has negative refractive power, the second lens group has positive refractive power, and the third lens group has positive refractive power; disposing the first lens group, the second lens group and the third lens group in such a manner that upon zooming from a wide-angle end state to a telephoto end state, a distance between the first lens group and the second lens group varies, and a distance between the second lens group and the third lens group varies, and the following conditional expression is satisfied:

$$2.4 < (ft^2 \times Dw23)/(fw^2 \times TLw) < 4.0$$

where fw denotes a focal length of the zoom lens in a wide-angle end state, Dw23 denotes a distance between the second lens group and the third lens group in the wide-angle end state, ft denotes a focal length of the zoom lens in the telephoto end state, and TLw denotes a total lens length of the zoom lens in the wide-angle end state.

According to a second invention, there is provided a zoom lens comprising, in order from an object side along an optical axis: a first lens group having negative refractive power; a second lens group having positive refractive power; and a third lens group having positive refractive power; upon zooming from a wide-angle end state to a telephoto end state, a distance between the first lens group and the second lens group varying, and a distance between the second lens group and the third lens group varying, and the following conditional expressions being satisfied:

$$0.65 < f2 \cdot TLt/ft^2 < 0.92$$

$$0.63 < ft \cdot Ymax/f1^2 < 0.80$$

where f2 denotes a focal length of the second lens group, TLt denotes a total lens length of the zoom lens in the telephoto end state, ft denotes a focal length of the zoom lens in the telephoto end state, Ymax denotes the maximum image height, and f1 denotes a focal length of the first lens group.

In the second invention, there is provided an optical apparatus equipped with the zoom lens according to the second invention.

In the second invention, there is provided a method for manufacturing a zoom lens including a first lens group, a second lens group, and a third lens group, comprising steps of: disposing each lens in such a manner that the first lens group has negative refractive power, the second lens group has positive refractive power, and the third lens group has positive refractive power; disposing the first lens group, the second lens group and the third lens group in such a manner that upon zooming from a wide-angle end state to a telephoto end state, a distance between the first lens group and the second lens group varies, and a distance between the second lens group and the third lens group varies, and the following conditional expressions are satisfied:

$$0.65 < f2 \cdot TLt/ft^2 < 0.92$$

$$0.63 < ft \cdot Ymax/f1^2 < 0.80$$

where f2 denotes a focal length of the second lens group, TLt denotes a total lens length of the zoom lens in the telephoto end state, ft denotes a focal length of the zoom lens in the telephoto end state, Ymax denotes the maximum image height, and f1 denotes a focal length of the first lens group.

The present invention makes it possible to provide a down-sized zoom lens having high optical performance, an optical apparatus equipped therewith, and a method for manufacturing the zoom lens system.

BRIEF DESCRIPTION OF THE DRAWINGS

FIG. 8 is a flowchart schematically explaining a method for manufacturing the zoom lens according to the first embodiment.

FIG. 9 is a flowchart schematically explaining another method for manufacturing the zoom lens according to the first embodiment.

FIG. 10 is a sectional view showing a lens configuration of a zoom lens according to a first example of a second embodiment.

FIG. 20 is a flowchart schematically explaining a method for manufacturing the zoom lens according to the second embodiment.

EMBODIMENT FOR CARRYING OUT THE INVENTION

A zoom lens according to an embodiment of a first invention (hereinafter called as a first embodiment) is explained below.

[First Embodiment]

Figure 7A:
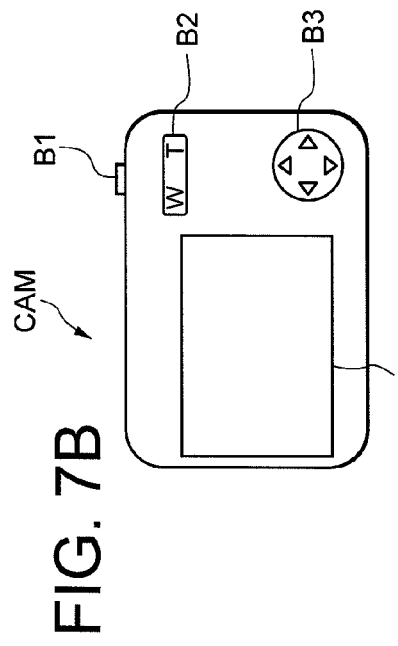
FIG. 7A is a front view of a digital still camera according to the first embodiment.
Figure 7B:
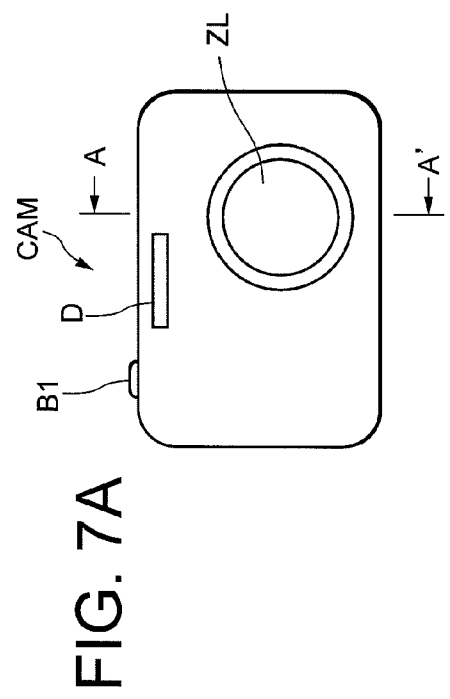
FIG. 7B is a rear view of a digital still camera according to the first embodiment.
Figure 7C:
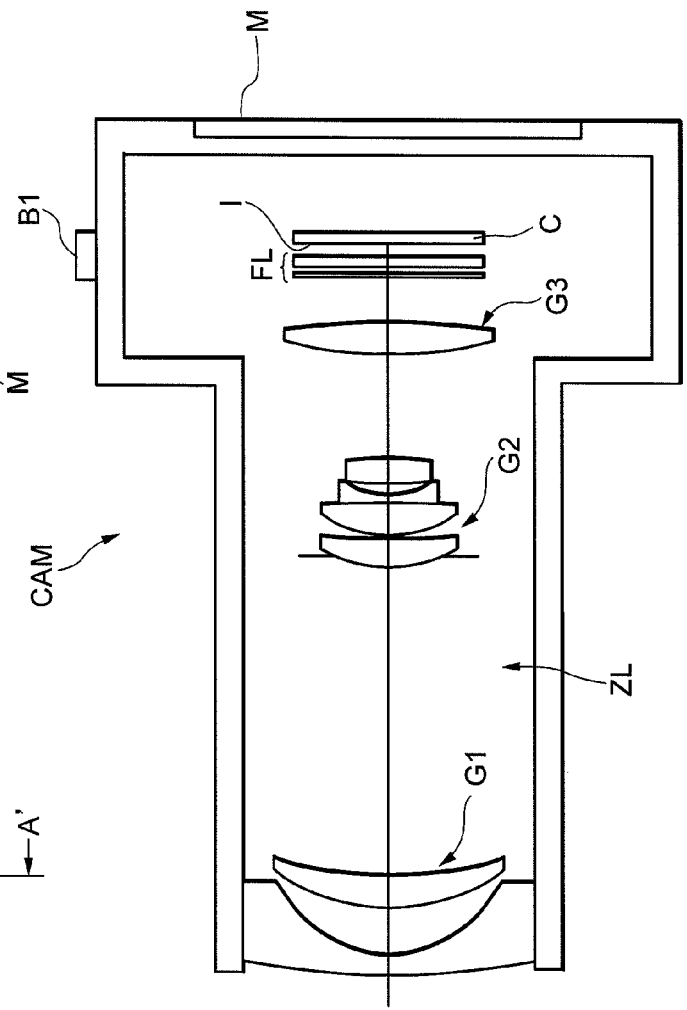
FIG. 7C is a sectional view along an arrow A-A' shown in FIG. 7A.

A digital still camera CAM equipped with a zoom lens according to the first embodiment of the present application is shown in FIG. 7. FIG. 7A shows a front view of the digital still camera CAM. FIG. 7B shows a rear view of the digital still camera CAM. FIG. 7C is a sectional view along an arrow A-A' shown in FIG. 7A.

In the digital still camera CAM shown in FIG. 7, when a power switch button (not shown) is pressed, a shutter (not shown) of an image-taking lens (ZL) is opened, light from an object (not shown) is converged by the image-taking lens (ZL), and an image is formed on an imaging device C (such as a CCD, or CMOS) disposed on the image plane I. The object image formed on the imaging device C is displayed on a liquid crystal monitor M disposed backside of the camera CAM. After fixing the image composition of the object image with observing the liquid crystal monitor M, a photographer depresses a release button B1 to take a picture of the object image by the imaging device C, and stores in a memory (not shown).

The image-taking lens is constructed by a zoom lens ZL according to the first embodiment explained later. In the digital still camera CAM, the following members are disposed such as an auxiliary light emitter D that emits auxiliary light when the object is dark, a W-T button B2 that makes the image-taking lens (zoom lens ZL) carry out zooming (varying magnification) between a wide-angle end state (W) and a telephoto end state (T), and a function button B3 that is used for setting various conditions of the digital still camera CAM.

Then, a zoom lens ZL according to the first embodiment is explained in detail.

A zoom lens ZL according to the first embodiment is a negative leading type zoom lens that includes, in order from an object side along an optical axis, a first lens group G1 having negative refractive power, a second lens group G2 having positive refractive power, and a third lens group G3 having positive refractive power. In the zoom lens ZL, upon zooming from a wide-angle end state to a telephoto end state, the first lens group G1 and the second lens group G2 are moved separately along the optical axis (for example, see FIG. 1), thereby decreasing a distance between the first lens group G1 and the second lens group G2, and increasing a distance between the second lens group G2 and the third lens group G3. A filter group FL composed of a low-pass filter, an infrared light blocking filter, and the like is disposed between the zoom lens ZL and the image plane I.

The second lens group G2 is a varying magnification portion and a master lens group, and the first lens group G1 is a compensator lens group. The third lens group G3 optimizes the position of an exit pupil of the zoom lens with respect to the imaging device C, and corrects aberrations remained uncorrected by the first lens group G1 and the second lens group G2.

In order to accomplish both of a wider angle of view and a higher zoom ratio with using the zoom lens ZL having such a lens configuration, various conditions have to be satisfied. In particular, in order to carry out excellent aberration correction, lens configuration of each lens group, refractive power of each lens, positions of aspherical lenses have to be appropriately arranged. On the other hand, in consideration of a practical point of view, the dimension of the zoom lens has to be sufficiently downsized.

In order to accomplish both of downsizing and high optical performance of the zoom lens ZL, the following conditional expression (1) is preferably satisfied:

$$2.4 < (ft^2 \times Dw23)/(fw^2 \times TLw) < 4.0 \tag{1}$$

where fw denotes a focal length of the zoom lens ZL in a wide-angle end state, Dw23 denotes a distance between the second lens group G2 and the third lens group G3 in the wide-angle end state, ft denotes a focal length of the zoom lens ZL in the telephoto end state, and TLw denotes a total lens length of the zoom lens ZL in the wide-angle end state. With this configuration, it becomes possible to reduce the total lens length of the zoom lens ZL as well as to excellently correct various aberrations, so that a downsized zoom lens ZL having high optical performance and an optical apparatus (digital still camera CAM) equipped therewith can be realized.

Conditional expression (1) defines an appropriate distance between the second lens group G2 and the third lens group G3 with respect to the zoom ratio. When the value (ft2×Dw23)/(fw2×TLw) falls below the lower limit of conditional expression (1), curvature of field in the wide-angle end state becomes difficult to be corrected, so that it is undesirable.

On the other hand, when the value (ft2×Dw23)/(fw2×TLw) exceeds the upper limit of conditional expression (1), spherical aberration in the telephoto end state becomes difficult to be corrected, so that it is undesirable.

With setting the lower limit of conditional expression (1) to 2.55 or the upper limit of conditional expression (1) to 3.80, the effect of the first embodiment can be exhibited. Moreover, with setting the lower limit of conditional expression (1) to 2.70 or the upper limit of conditional expression (1) to 3.60, the effect of the first embodiment can fully be exhibited.

In such a zoom lens ZL, the following conditional expression (2) is preferably satisfied:

$$1.9 < ft/(-f1) < 2.3 \tag{2}$$

where f1 denotes a focal length of the first lens group G1.

Conditional expression (2) defines appropriate refractive power of the first lens group G1. When the value ft/(−f1) falls below the lower limit of conditional expression (2), the diameter of the front lens in the wide-angle end state becomes large, and distortion and curvature of field in the wide-angle end state become difficult to be corrected, so that it is undesirable. On the other hand, when the value ft/(−f1) exceeds the upper limit of conditional expression (2), spherical aberration in the telephoto end state becomes difficult to be corrected, so that it is undesirable.

With setting the lower limit of conditional expression (2) to 1.94 or the upper limit of conditional expression (2) to 2.23, the effect of the first embodiment can be exhibited. Moreover, with setting the lower limit of conditional expression (2) to 1.98 or the upper limit of conditional expression (2) to 2.17, the effect of the first embodiment can fully be exhibited.

In such a zoom lens ZL, the following conditional expression (3) is preferably satisfied:

$$1.7 < (fw \times TLw)/(ft \times Ymax) < 2.0 \tag{3}$$

where Ymax denotes the maximum image height of the zoom lens ZL.

Conditional expression (3) defines an appropriate total lens length of the zoom lens with respect to the zoom ratio. When the value (fw×TLw)/(ft×Ymax) falls below the lower limit of conditional expression (3), spherical aberration in the telephoto end state becomes difficult to be corrected, so that it is undesirable. On the other hand, when the value (fw×TLw)/(ft×Ymax) exceeds the upper limit of conditional expression (3), coma in the intermediate focal length state becomes difficult to be corrected, so that it is undesirable.

With setting the lower limit of conditional expression (3) to 1.75 or the upper limit of conditional expression (3) to 1.95, the effect of the first embodiment can be exhibited. Moreover, with setting the lower limit of conditional expression (3) to 1.80 or the upper limit of conditional expression (3) to 1.93, the effect of the first embodiment can fully be exhibited.

In such a zoom lens ZL, the following conditional expressions (4) and (5) are preferably satisfied:

$$3.15 < Ndn + (0.05 \times vdn) < 3.60 \tag{4}$$

$$1.8 < Ndn < 2.5 \tag{5}$$

where Ndn denotes a refractive index at d-line of a negative lens having highest refractive index at d-line in the second lens group, and vdn denotes an Abbe number of the negative lens.

Conditional expression (4) is for excellently correcting chromatic difference in spherical aberration in the telephoto end state. When the value Ndn+(0.05×vdn) falls below the lower limit of conditional expression (4), spherical aberration in shorter wavelength side with respect to d-line becomes excessively undercorrected, so that it is undesirable. On the other hand, when the value Ndn+(0.05×vdn) exceeds the upper limit of conditional expression (4), spherical aberration in shorter wavelength side with respect to d-line becomes excessively overcorrected, so that it is undesirable.

Conditional expression (5) defines an appropriate range of refractive index of the negative lens in the second lens group. When the value Ndn falls below the lower limit of conditional expression (5), curvature of field of sagittal image plane in the wide-angle end state becomes difficult to be corrected, so that it is undesirable. On the other hand, when the value Ndn exceeds the upper limit of conditional expression (5), Petzval sum becomes excessively large, so that curvature of field in the intermediate focal length state becomes difficult to be corrected. Accordingly, it is undesirable.

With setting the lower limit of conditional expression (4) to 3.20 or the upper limit of conditional expression (4) to 3.55, the effect of the first embodiment can be exhibited. Moreover, with setting the lower limit of conditional expression (4) to 3.25 or the upper limit of conditional expression (4) to 3.50, the effect of the first embodiment can fully be exhibited.

With setting the lower limit of conditional expression (5) to 1.85 or the upper limit of conditional expression (5) to 2.35, the effect of the first embodiment can be exhibited. Moreover, with setting the lower limit of conditional expression (5) to 1.90 or the upper limit of conditional expression (5) to 2.20, the effect of the first embodiment can fully be exhibited.

In such a zoom lens ZL, the third lens group G3 is constructed by a single positive lens, and the following conditional expression (6) is preferably satisfied:

$$-0.4<(Rb+Ra)/(Rb-Ra)<1.0 \quad (6)$$

where Ra denotes a radius of curvature of the object side surface of the positive lens, and Rb denotes a radius of curvature of the image side surface of the positive lens.

Conditional expression (6) defines an appropriate shape of the positive lens in the third lens group G3. When the value (Rb+Ra)/(Rb−Ra) falls below the lower limit of conditional expression (6), distortion and astigmatic difference in the wide-angle end state become difficult to be corrected at the same time, so that it is undesirable. On the other hand, when the value (Rb+Ra)/(Rb−Ra) exceeds the upper limit of conditional expression (6), coma in the wide-angle end state becomes difficult to be corrected, so that it is undesirable.

With setting the lower limit of conditional expression (6) to −0.25 or the upper limit of conditional expression (6) to 0.8, the effect of the first embodiment can be exhibited. Moreover, with setting the lower limit of conditional expression (6) to −0.1 or the upper limit of conditional expression (6) to 0.6, the effect of the first embodiment can fully be exhibited.

In such a zoom lens ZL, at least the first lens group G1 and the second lens group G2 are preferably moved such that a distance between the first lens group G1 and the second lens group G2 decreases, and a distance between the second lens group G2 and the third lens group G3 increases upon zooming from the wide-angle end state to the telephoto end state.

In such a zoom lens ZL, the first lens group G1 preferably consists of, in order from the object side along the optical axis, a negative lens and a positive lens. With composing the first lens group G1 in this manner, the outer diameter of the first lens group becomes smaller, and it becomes possible to excellently correct distortion and astigmatic difference in the wide-angle end state and spherical aberration in the telephoto end state.

In such a zoom lens ZL, the most object side lens in the first lens group G1 preferably has an aspherical surface. With making the most object side lens in the first lens group G1 an aspherical lens, it becomes possible to excellently correct distortion and coma in the wide-angle end state and coma in the telephoto end state.

In such a zoom lens ZL, the second lens group G2 preferably includes, in order from the object side along the optical axis, two positive lenses, and one negative lens. With this lens configuration, it becomes possible to move the principal point of the second lens group to the object side, so that in addition to be able to prevent the first lens group G1 and the second lens group G2 from contact with each other in the telephoto end state, spherical aberration can excellently be corrected.

In such a zoom lens ZL, one positive lens and one negative lens are preferably disposed in the second lens group G2 in this order from the image side along the optical axis. With this lens configuration, it becomes possible to excellently correct curvature of field in the wide-angle end state.

Accordingly, the second lens group G2 may be composed of, in order from the object side along the optical axis, two positive lenses, one negative lens, and one positive lens. With this lens configuration, in addition to be able to prevent the first lens group G1 and the second lens group G2 from contact with each other in the telephoto end state, spherical aberration can excellently be corrected as described above, and, moreover, curvature of field in the wide-angle end state can excellently be corrected.

In such a zoom lens ZL, the most object side lens in the second lens group G2 preferably has an aspherical surface. With making the most object side surface of the second lens group an aspherical surface, it becomes possible to excellently correct spherical aberration.

In such a zoom lens ZL, the third lens group G3 is preferably fixed on the optical axis upon zooming from the wide-angle end state to the telephoto end state. With fixing the third lens group G3, it becomes possible to excellently correct lateral chromatic aberration in the telephoto end state.

In a wide zoom lens ZL according to the first embodiment, the first lens group G1 or the third lens group G3 may be moved toward the object side thereby carrying out focusing from an infinity object to a close object. However, the method for moving the first lens group toward the object side tends to reduce light amount on the periphery of the image frame upon focusing on the closest shooting range, so that it is most preferable that the third lens group G3 is moved toward the object side upon focusing.

Then, an outline of a method for manufacturing a zoom lens ZL is explained below with reference to FIG. 8. At first, the first lens group G1, the second lens group G2 and the third lens group G3 according to the first embodiment are disposed in a lens barrel having a cylindrical shape (Step S1). Upon disposing each lens group into the lens barrel, each lens group may be disposed one by one in order from the object side. Alternatively, at first a portion of lens groups or all lens groups may be held by a holding member, and then, assembled together with a lens barrel member. After assembling each lens group into the lens barrel, whether an image of an object can be formed, in other words, the center of each lens group is aligned or not is checked in a condition that each lens group is assembled in the lens barrel (Step S2). After confirming the formation of the image, each movement of the zoom lens ZL is to be confirmed (Step S3).

As for examples of various kinds of movement, there are a zooming movement carried out by moving lens groups (the first lens group G1 and the second lens group G2 in the first embodiment) along the optical axis, a focusing movement that a lens group (the third lens group G3 in the first embodiment) is moved along the optical axis for carrying out focusing from an infinity object to a close object, and an image-blur-correction movement carried out by moving at least a portion of lenses in a direction including a component perpendicular to the optical axis. In the first embodiment, upon zooming from the wide-angle end state to the telephoto end state, the first lens group G1 and the second lens group G2 move separately along the optical axis such that a distance between the first lens group G1 and the second lens group G2 decreases, and a distance between the second lens group G2 and the third lens group G3 increases. Moreover, the order of confirmation of each movement is arbitrary. With this method for manufacturing, it becomes possible to obtain a downsized zoom lens ZL having high optical performance.

Another method for manufacturing a zoom lens ZL according to the first embodiment is a method for manufacturing a zoom lens including, in order from an object side, a first lens group, a second lens group and a third lens group, the method comprising steps of: disposing each lens in such a manner that the first lens group has negative refractive power, the second lens group has positive refractive power, and the third lens group has positive refractive power; and disposing each lens in such a manner that upon zooming from a wide-angle end state to a telephoto end state, a distance between the first lens group and the second lens group varies, and a distance between the second lens group and the third lens group varies, and the following conditional expression (1) is satisfied:

$$2.4<(ft^2\times Dw23)/(fw^2\times TLw)<4.0 \quad (1)$$

where fw denotes a focal length of the zoom lens in a wide-angle end state, Dw23 denotes a distance between the second lens group and the third lens group in the wide-angle end state, ft denotes a focal length of the zoom lens in the telephoto end state, and TLw denotes a total lens length of the zoom lens in the wide-angle end state.

With said another method for manufacturing a zoom lens according to the first embodiment, it becomes possible to provide a method for manufacturing a downsized zoom lens ZL having high optical performance.

In said another method for manufacturing a zoom lens ZL according to the first embodiment, a step for satisfying the following conditional expression (2) is preferably included:

$$1.9<ft/(-f1)<2.3 \quad (2)$$

where f1 denotes a focal length of the first lens group G1.

With said another method for manufacturing a zoom lens according to the first embodiment, it becomes possible to provide a method for manufacturing a downsized zoom lens ZL having high optical performance.

In said another method for manufacturing a zoom lens according to the first embodiment, a step for satisfying the following conditional expression (3) is preferably included:

$$1.7<(fw\times TLw)/(ft\times Ymax)<2.0 \quad (3)$$

where Ymax denotes the maximum image height of the zoom lens.

With said another method for manufacturing a zoom lens according to the first embodiment, it becomes possible to provide a method for manufacturing a downsized zoom lens ZL having high optical performance.

EXAMPLES OF THE FIRST EMBODIMENT

Example 1-1

Each example according to the first embodiment is explained below with reference to accompanying drawings.

Figure 1:
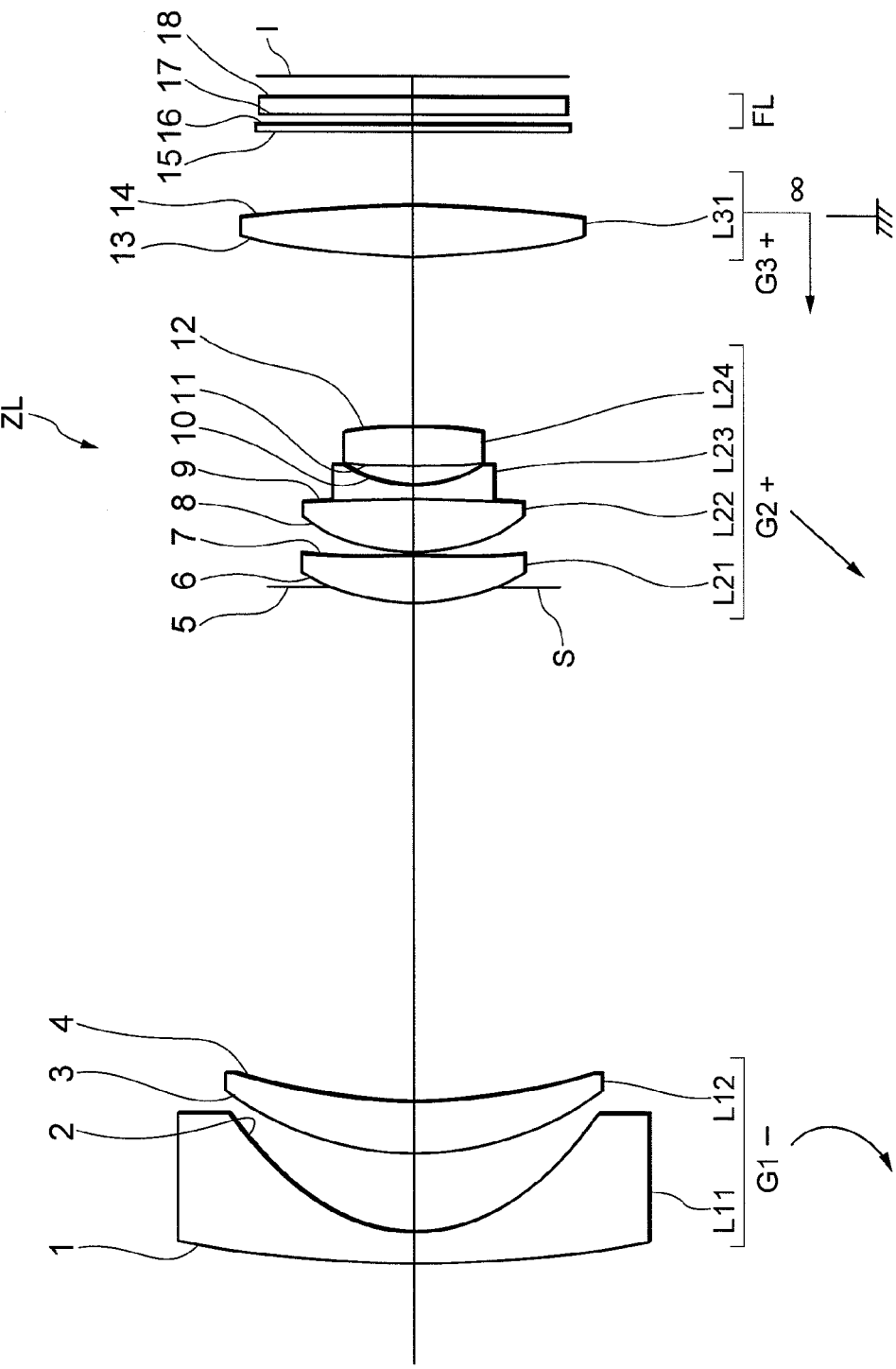
FIG. 1 is a sectional view showing a lens configuration and zoom trajectories of a zoom lens according to a first example of a first embodiment.

At first, a first example (Example 1-1) of the first embodiment is explained with using FIGS. 1, 2A, 2B, and 2C, and Table 1. FIG. 1 is a sectional view showing a lens configuration and zoom trajectories of a zoom lens according to a first example (Example 1-1) of the first embodiment.

As described above, a zoom lens ZL according to Example 1-1 of the first embodiment is composed of, in order from an object side along an optical axis, a first lens group G1 having negative refractive power, a second lens group G2 having positive refractive power, and a third lens group G3 having positive refractive power. Upon varying magnification (zooming) from a wide-angle end state to a telephoto end state, the first lens group G1 and the second lens group G2 are moved separately along the optical axis in such a manner that a distance between the first lens group G1 and the second lens group G2 decreases, and a distance between the second lens group G2 and the third lens group G3 increases. In this instance, the first lens group G1 is at first moved to an image side and then moved to the object side. The second lens group G2 is moved monotonously to the object side. The third lens group G3 is fixed.

The first lens group G1 is composed of, in order from the object side along the optical axis, a negative meniscus lens L11 having a convex surface facing the object side, and a positive meniscus lens L12 having a convex surface facing the object side. The image side lens surface of the negative meniscus lens L11 is an aspherical surface. The second lens group G2 is composed of, in order from the object side along the optical axis, a positive meniscus lens L21 having a convex surface facing the object side, a double convex positive lens L22, a double concave negative lens L23, and a double convex positive lens L24. The object side lens surface of the positive meniscus lens L21 is an aspherical surface. The double convex positive lens L22 and the double concave negative lens L23 are preferably a cemented lens. The third lens group G3 is composed of a single positive lens L31, and the third lens group G3 is moved along the optical axis thereby carrying out focusing from an infinity object to a close object.

An f-number defining member S constructed by a sheet or a lens frame is disposed to the image side of a vertex on the optical axis of the positive meniscus lens L21 in the second lens group G2 , and moved in a body with the second lens group G2 upon zooming from the wide-angle end state to the telephoto end state. A filter group FL disposed between the zoom lens ZL and the image plane I is composed of a low-pass filter, an infrared light blocking filter, and the like.

The following Tables 1 through 3 show various values of zoom lenses according to Example 1-1 through 1-3 of the first embodiment. In [Specifications], f denotes a focal length, FNO denotes an f-number, 2ω denotes an angle of view (unit: degree), and Ymax denotes the maximum image height. In [Lens Data], i denotes an optical surface number counted in order from the object side, r denotes a radius of curvature of a lens surface, d denotes a face-to-face distance along an optical axis, nd denotes a refractive index at d-line (wavelength λ=587.6 nm), and vd denotes an Abbe number at d-line (wavelength λ=587.6 nm). Incidentally, the notation "*" attached to the right side of a surface number shows that the lens surface is an aspherical surface. A refractive index of the air nd=1.000000 is omitted, and "r=∞" indicates a plane surface.

In [Aspherical Surface Data], when "y" denotes a vertical height from the optical axis, S(y) denotes a sag amount which is a distance along the optical axis from the tangent surface at the vertex of the aspherical surface to the aspherical surface at the vertical height y from the optical axis, R denotes a radius of curvature of a reference sphere (paraxial radius of curvature), κ denotes a conical coefficient, and An denotes an aspherical coefficient of n-th order (n=4, 6, 8, 10), the aspherical surface is exhibited by the following expression (A):

$$S(y)=(y^2/R)/[1+\{1-\kappa\times(y/R)^2\}^{1/2}]+A4\times y^4+A6\times y^6+A8\times y^8+A10\times y^{10} \quad (A)$$

In each example, the second order aspherical coefficient A2 is zero, so that A2 is omitted. In [Aspherical Surface Data], "E-n" denotes "$\times 10^{-n}$".

In [Variable Distances], d4 denotes a distance along the optical axis between the first lens group G1 and the second lens group G2 (the f-number defining member S), d12 denotes a distance along the optical axis between the second lens group G2 and the third lens group G3, d14 denotes a distance along the optical axis between the third lens group G3 and the filter group FL, f denotes a focal length, TL denotes a total lens length, and Bf denotes a back focal length.

These distances d4, d12, d14, the focal length f and the total lens length TL vary upon zooming. In respective tables for various values, "mm" is generally used for the unit of length such as the focal length f, the radius of curvature r and the distance to the next lens surface d. However, since similar optical performance can be obtained by an optical system proportionally enlarged or reduced its dimension, the unit is not necessarily to be limited to "mm". The explanation of reference symbols is the same in the other Examples.

Various values associated with the lens system according to Example 1-1 are listed in Table 1. Incidentally, the surface number 1 through 18 in Table 1 corresponds to the surface 1 through 18 in FIG. 1. The lens group number G1 through G3 in Table 1 correspond to each lens group G1 through G3 in FIG. 1. In Example 1-1, each of the second surface and the sixth surface is an aspherical surface.

TABLE 1

[Specifications]

Zoom Ratio = 4.72
f = 5.15~24.30
FNO = 2.74~6.99
2ω = 77.14~18.16
Ymax = 3.9

[Lens Data]

| i | r | d | nd | νd |
|---|---|---|----|----|
| 1 | 35.1579 | 0.9500 | 1.84973 | 40.30 |
| 2* | 4.8867 | 2.3000 | | |
| 3 | 8.9145 | 1.5500 | 1.92286 | 20.88 |
| 4 | 16.5874 | (d4) | | |
| 5 | ∞ | −0.5000 | f-number defining member S | |
| 6* | 5.8500 | 1.4000 | 1.77377 | 47.18 |
| 7 | 45.3904 | 0.1000 | | |
| 8 | 5.2405 | 1.6000 | 1.71999 | 50.24 |
| 9 | −113.6153 | 0.4000 | 2.00330 | 28.27 |
| 10 | 3.5525 | 0.5700 | | |
| 11 | 19.2838 | 1.1500 | 1.65844 | 50.88 |
| 12 | −20.0191 | (d12) | | |
| 13 | 19.0671 | 1.5000 | 1.60300 | 65.47 |
| 14 | −41.0965 | (d14) | | |
| 15 | ∞ | 0.2100 | 1.51680 | 64.12 |
| 16 | ∞ | 0.2900 | | |
| 17 | ∞ | 0.5000 | 1.51680 | 64.12 |
| 18 | ∞ | (Bf) | | |

[Aspherical Surface Data]

Surface Number: 2

κ = 0.1871,     A4 = 2.54930E−04,
A6 = 3.99050E−06,     A8 = −5.58790E−08,
A10 = 7.87310E−10

Surface Number: 6

κ = 0.0734,     A4 = 3.54380E−04,
A6 = 3.04510E−06,     A8 = 0.00000E+00,
A10 = 0.00000E+00

[Variable Distances]

upon focusing on infinity
W: wide-angle end state,
M: intermediate focal length state,
T: telephoto end state

| | W | M | T |
|---|---|---|---|
| f= | 5.15 | 11.20 | 24.30 |
| d4= | 15.3894 | 5.3891 | 0.8000 |
| d12= | 5.0523 | 11.3904 | 25.1141 |
| d14= | 2.2303 | 2.2303 | 2.2303 |
| Bf= | 0.6000 | 0.6000 | 0.6000 |
| TL= | 35.2920 | 31.6297 | 40.7643 |

[Lens Group Data]

| Group | I | focal length |
|---|---|---|
| G1 | 1 | −11.84 |
| G2 | 6 | 9.99 |
| G3 | 13 | 21.80 |

[Values for Conditional Expressions]

(1) (ft$^2$ × Dw23)/(fw$^2$ × TLw) = 3.1872
(2) ft/(−f1) = 2.0526
(3) (fw × TLw)/(ft × Ymax) = 1.9178
(4) Ndn + (0.05 × νdn) = 3.417
(5) Ndn = 2.003
(6) (Rb + Ra)/(Rb − Ra) = 0.3662

As seen above, Example 1-1 of the first embodiment satisfies conditional expressions (1) through (6).

Figure 2A:
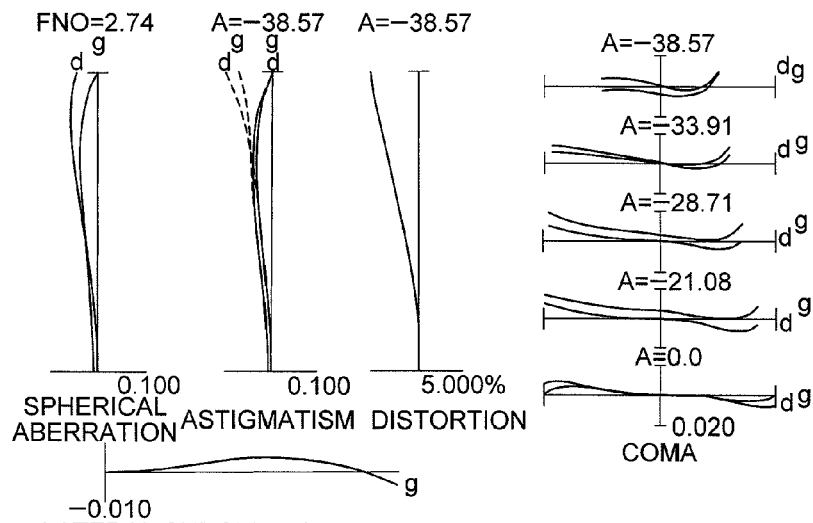
FIG. 2A is graphs showing various aberrations of the zoom lens according to the first example of the first embodiment in a wide-angle end state upon focusing on infinity.
Figure 2B:
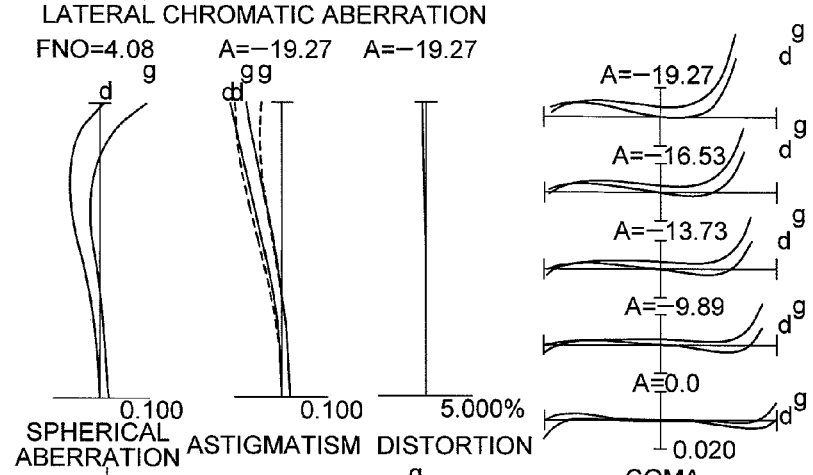
FIG. 2B is graphs showing various aberrations of the zoom lens according to the first example of the first embodiment in an intermediate focal length state upon focusing on infinity.
Figure 2C:
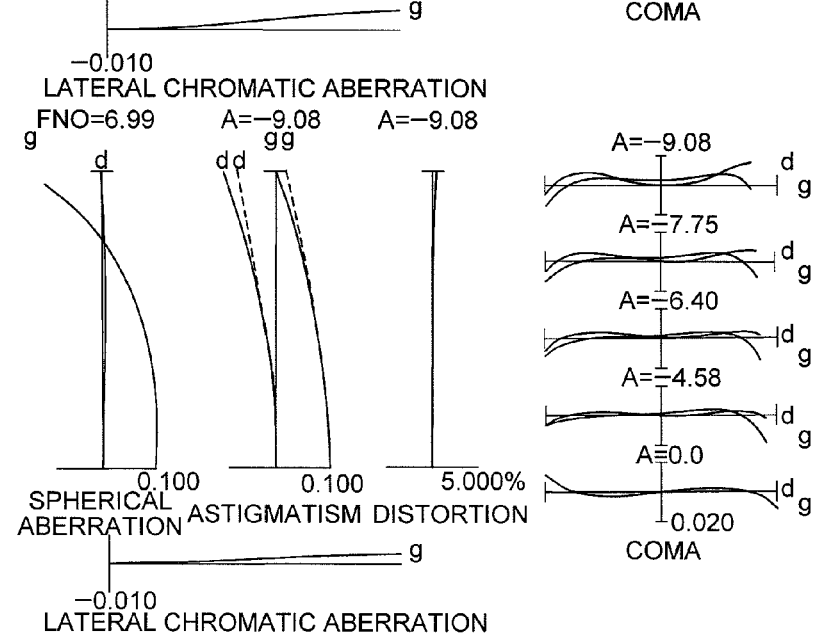
FIG. 2C is graphs showing various aberrations of the zoom lens according to the first example of the first embodiment in a telephoto end state upon focusing on infinity.

FIG. 2A is graphs showing various aberrations of the zoom lens ZL according to Example 1-1 of the first embodiment in a wide-angle end state (f=5.15 mm) upon focusing on infinity. FIG. 2B is graphs showing various aberrations of the zoom lens according to Example 1-1 of the first embodiment in an intermediate focal length state (f=11.20 mm) upon focusing on infinity. FIG. 2C is graphs showing various aberrations of the zoom lens according to Example 1-1 of the first embodiment in a telephoto end state (f=24.30 mm) upon focusing on infinity.

In respective graphs, FNO denotes an f-number, A denotes a half angle of view with respect to each image height. In respective graphs, d denotes an aberration curve at d-line (wavelength λ=587.6nm), g denotes an aberration curve at g-line (wavelength λ=435.8nm), and. In graphs showing astigmatism, a solid line indicates a sagittal image plane, and a broken line indicates a meridional image plane.

As is apparent from the respective graphs, the zoom lens ZL according to Example 1-1 of the first embodiment shows superb optical performance as a result of good corrections to various aberrations from the wide-angle end state through the telephoto end state. As a result, a digital still camera 1 equipped with the zoom lens ZL according to Example 1-1 of the first embodiment makes it possible to secure superb optical performance.

Example 1-2

A second example (Example 1-2) of the first embodiment is explained with using FIGS. 3, 4A, 4B, and 4C, and Table 2.

Figure 3:
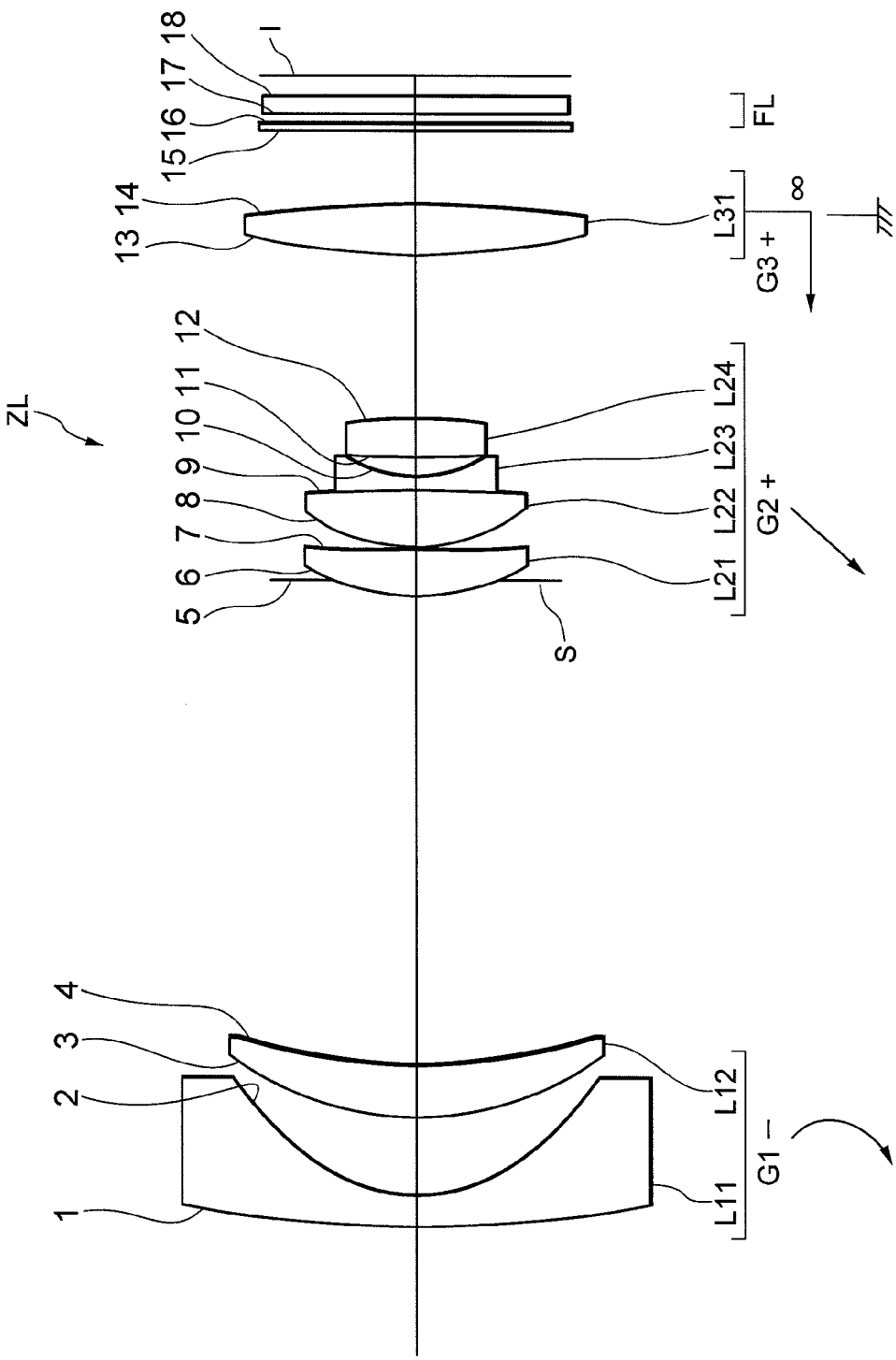
FIG. 3 is a sectional view showing a lens configuration and zoom trajectories of a zoom lens according to a second example of the first embodiment.

FIG. 3 is a sectional view showing a lens configuration and zoom trajectories of a zoom lens according to a second example (Example 1-2) of the first embodiment.

Incidentally, the zoom lens according to Example 1-2 of the first embodiment is the same as the zoom lens according to Example 1-1 of the first embodiment except a position of an aspherical surface, so that the same reference number as Example 1-1 is attached and duplicated explanations are omitted. In Example 1-2, the both surfaces of the negative meniscus lens L11 in the first lens group G1 are aspherical surfaces. The object side surface of the positive meniscus lens L21 in the second lens group G2 is an aspherical surface.

Various values associated with the lens system according to Example 1-2 are listed in Table 2. Incidentally, the surface number 1 through 18 in Table 2 corresponds to the surface 1 through 18 in FIG. 3. The lens group number G1 through G3 in Table 2 correspond to each lens group G1 through G3 in FIG. 3. In Example 1-2, each of the first surface, the second surface and the sixth surface is an aspherical surface.

TABLE 2

[Specifications]

Zoom Ratio = 4.72
f = 5.15~24.30
FNO = 2.70~6.96
2ω = 77.14~18.16
Ymax = 3.9

[Lens Data]

| i | r | d | nd | vd |
|---|---|---|---|---|
| 1* | 27.8720 | 0.9500 | 1.88300 | 40.77 |
| 2* | 4.7990 | 2.3000 | | |
| 3 | 8.6689 | 1.5000 | 2.00170 | 20.65 |
| 4 | 14.5829 | (d4) | | |
| 5 | ∞ | −0.5000 | f-number defining member S | |
| 6* | 6.1113 | 1.3500 | 1.77377 | 47.18 |
| 7 | 45.9826 | 0.1000 | | |
| 8 | 5.0297 | 1.7000 | 1.71999 | 50.24 |
| 9 | −60.1923 | 0.4000 | 2.00330 | 28.27 |
| 10 | 3.5398 | 0.5700 | | |
| 11 | 17.9856 | 1.1500 | 1.65844 | 50.88 |
| 12 | −18.6844 | (d12) | | |
| 13 | 19.3972 | 1.5000 | 1.60300 | 65.47 |
| 14 | −40.7488 | (d14) | | |
| 15 | ∞ | 0.2100 | 1.51680 | 64.12 |
| 16 | ∞ | 0.2900 | | |
| 17 | ∞ | 0.5000 | 1.51680 | 64.12 |
| 18 | ∞ | (Bf) | | |

[Aspherical Surface Data]

Surface Number: 1

κ = −2.0543          A4 = −1.02800E−05
A6 = 2.65770E−07     A8 = 0.00000E+00
A10 = 0.00000E+00

Surface Number: 2

κ = 0.1671           A4 = 2.87890E−04
A6 = 5.79920E−06     A8 = −1.23600E−07
A10 = 2.97850E−09

Surface Number: 6

κ = 0.1791           A4 = 2.76980E−04
A6 = 2.30580E−06     A8 = 0.00000E+00
A10 = 0.00000E+00

[Variable Distances]

upon focusing on infinity
W: wide-angle end state,

TABLE 2-continued

M: intermediate focal length state,
T: telephoto end state

| | W | M | T |
|---|---|---|---|
| f= | 5.15 | 11.20 | 24.30 |
| d4= | 14.6119 | 5.1445 | 0.8000 |
| d12= | 4.8040 | 11.1758 | 24.9728 |
| d14= | 2.2919 | 2.2919 | 2.2919 |
| Bf= | 0.6000 | 0.6000 | 0.6000 |
| TL= | 34.3278 | 31.2323 | 40.6846 |

[Lens Group Data]

| Group | I | focal length |
|---|---|---|
| G1 | 1 | −11.50 |
| G2 | 6 | 9.75 |
| G3 | 13 | 22.00 |

[Values for Conditional Expressions]

(1) $(ft^2 \times Dw23)/(fw^2 \times TLw) = 3.1157$
(2) $ft/(-f1) = 2.1130$
(3) $(fw \times TLw)/(ft \times Ymax) = 1.8654$
(4) $Ndn + (0.05 \times vdn) = 3.417$
(5) $Ndn = 2.003$
(6) $(Rb + Ra)/(Rb - Ra) = 0.3550$ As seen above, Example 1-2 of the first embodiment satisfies conditional expressions (1) through (6).

Figure 4A:
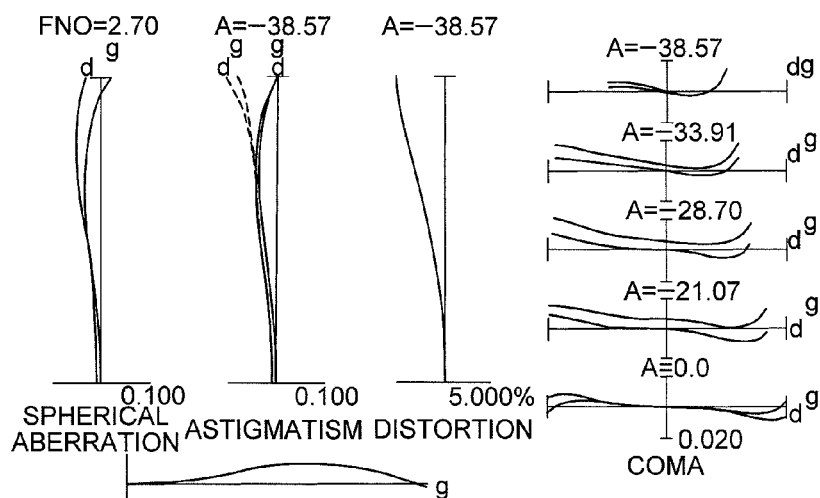
FIG. 4A is graphs showing various aberrations of the zoom lens according to the second example of the first embodiment in a wide-angle end state upon focusing on infinity.
Figure 4B:
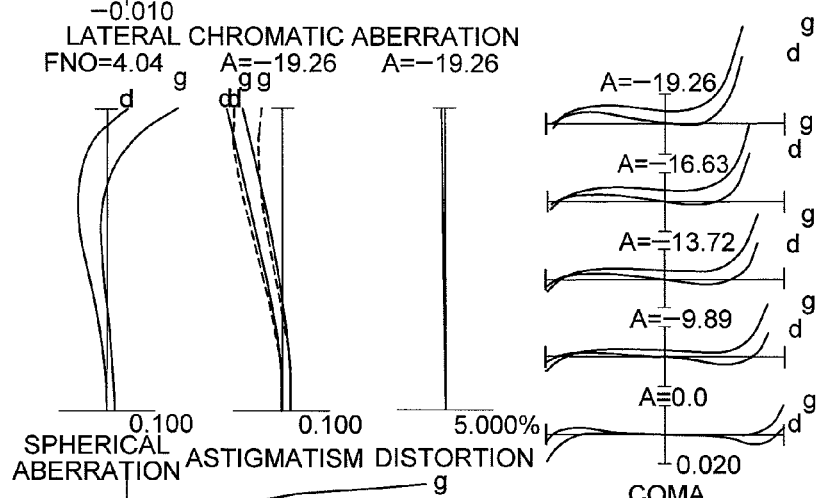
FIG. 4B is graphs showing various aberrations of the zoom lens according to the second example of the first embodiment in an intermediate focal length state upon focusing on infinity.
Figure 4C:
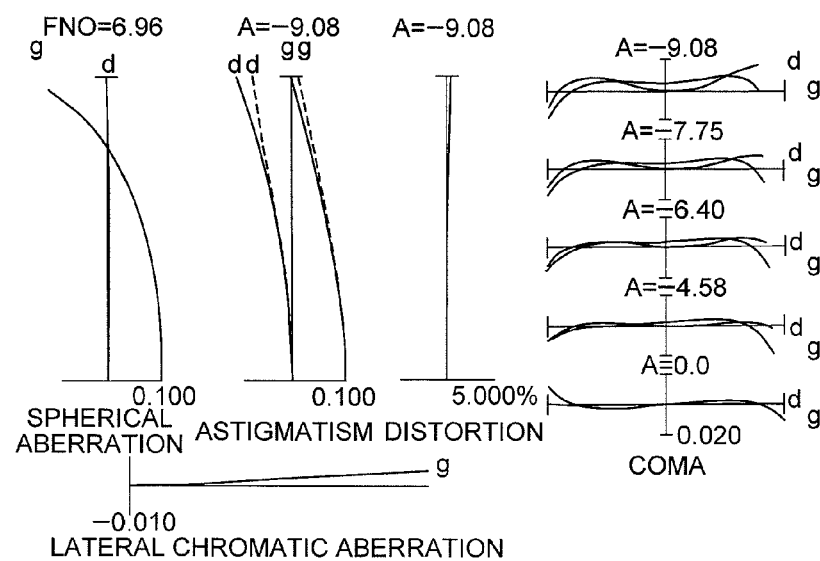
FIG. 4C is graphs showing various aberrations of the zoom lens according to the second example of the first embodiment in a telephoto end state upon focusing on infinity.

FIG. 4A is graphs showing various aberrations of the zoom lens ZL according to Example 1-2 of the first embodiment in a wide-angle end state (f=5.15 mm) upon focusing on infinity. FIG. 4B is graphs showing various aberrations of the zoom lens according to Example 1-2 of the first embodiment in an intermediate focal length state (f=11.20 mm) upon focusing on infinity. FIG. 4C is graphs showing various aberrations of the zoom lens according to Example 1-2 of the first embodiment in a telephoto end state (f=24.30 mm) upon focusing on infinity.

As is apparent from the respective graphs, the zoom lens ZL according to Example 1-2 of the first embodiment shows superb optical performance as a result of good corrections to various aberrations from the wide-angle end state through the telephoto end state. As a result, a digital still camera 1 equipped with the zoom lens ZL according to Example 1-2 of the first embodiment makes it possible to secure superb optical performance.

Example 1-3

Figure 5:
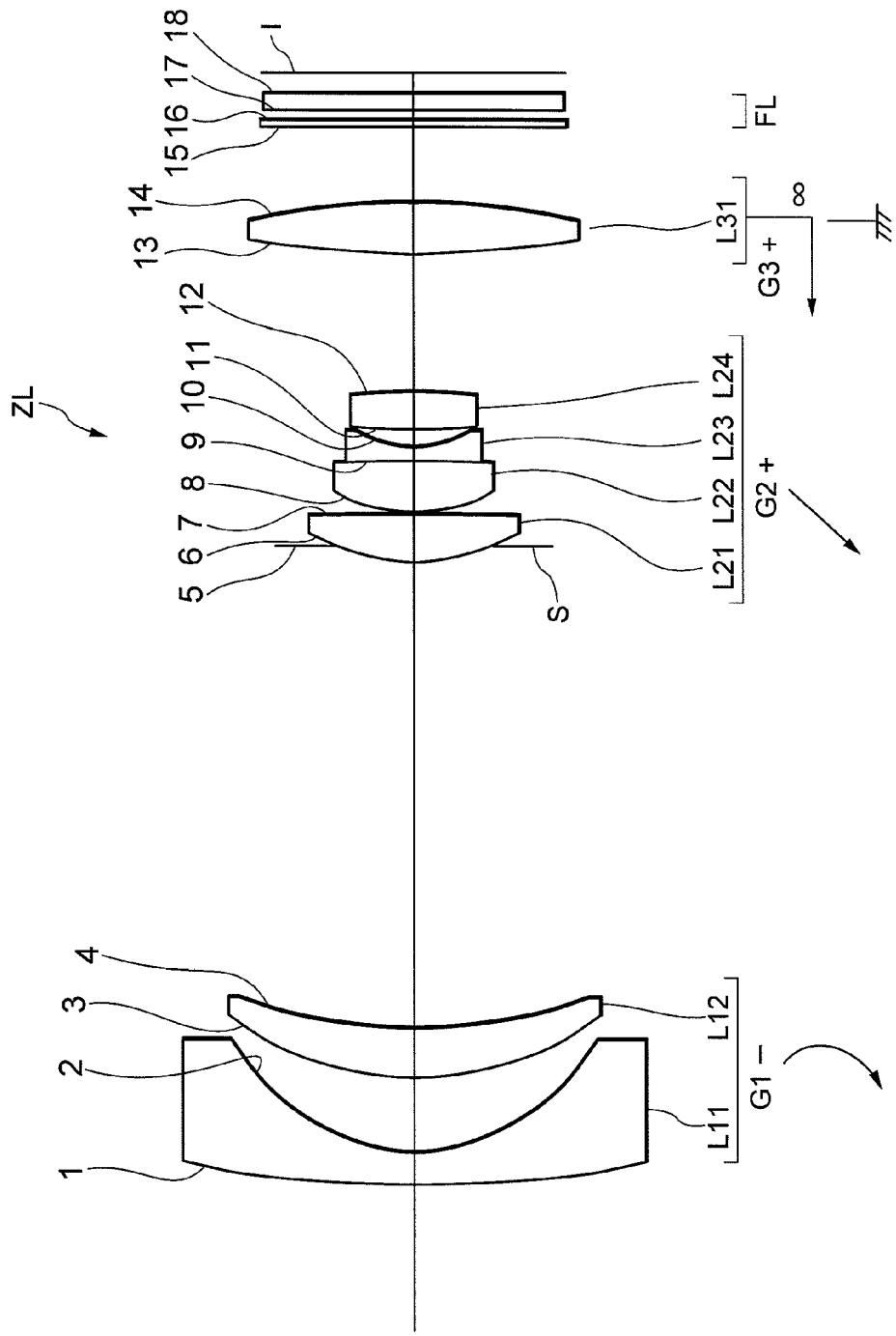
FIG. 5 is a sectional view showing a lens configuration and zoom trajectories of a zoom lens according to a third example of the first embodiment.

A third example (Example 1-3) of the first embodiment is explained with using FIGS. 5, 6A, 6B, and 6C, and Table 3. FIG. 5 is a sectional view showing a lens configuration and zoom trajectories of a zoom lens according to a third example (Example 1-3) of the first embodiment.

Incidentally, the zoom lens according to Example 1-3 of the first embodiment is the same as the zoom lens according to Example 1-1 of the first embodiment except a position of an aspherical surface, so that the same reference number as Example 1-1 is attached and duplicated explanations are omitted. In Example 1-3, the both surfaces of the negative meniscus lens L11 in the first lens group G1 are aspherical surfaces. The object side surface of the positive meniscus lens L21 in the second lens group G2 is an aspherical surface.

Various values associated with the lens system according to Example 1-3 are listed in Table 3. Incidentally, the surface number 1 through 18 in Table 3 corresponds to the surface 1 through 18 in FIG. 5. The lens group number G1 through G3 in Table 3 correspond to each lens group G1 through G3 in FIG. 5. In Example 1-3, each of the first surface, the second surface and the sixth surface is an aspherical surface.

TABLE 3

[Specifications]

Zoom Ratio = 4.72
f = 5.15~24.30
FNO = 2.70~6.99
2ω = 78.36~18.30
Ymax = 3.9

[Lens Data]

| i | r | d | nd | vd |
|---|---|---|---|---|
| 1* | 23.3678 | 0.9500 | 1.88300 | 40.77 |
| 2* | 4.7898 | 2.3000 | | |
| 3 | 8.9009 | 1.5000 | 2.00170 | 20.65 |
| 4 | 14.7464 | (d4) | | |
| 5 | ∞ | −0.5000 | f-number defining member S | |
| 6* | 5.7361 | 1.4500 | 1.77377 | 47.18 |
| 7 | 443.6780 | 0.1000 | | |
| 8 | 5.0767 | 1.5500 | 1.69350 | 53.22 |
| 9 | −74.6228 | 0.4000 | 2.00330 | 28.27 |
| 10 | 3.4025 | 0.5700 | | |
| 11 | 22.3949 | 1.1000 | 1.63930 | 44.89 |
| 12 | −22.5014 | (d12) | | |
| 13 | 28.0674 | 1.5500 | 1.61800 | 63.38 |
| 14 | −23.7357 | (d14) | | |
| 15 | ∞ | 0.2100 | 1.51680 | 64.12 |
| 16 | ∞ | 0.2900 | | |
| 17 | ∞ | 0.5000 | 1.51680 | 64.12 |
| 18 | ∞ | (Bf) | | |

[Aspherical Surface Data]

Surface Number: 1

κ = −99.0000         A4 = 2.90520E−05
A6 = 6.39520E−06     A8 = −1.40940E−07
A10 = 9.87060E−10

Surface Number: 2

κ = −2.1845          A4 = 1.86910E−03
A6 = −2.40760E−05    A8 = 8.48860E−07
A10 = −1.21150E−08

Surface Number: 6

κ = −1.2760,         A4 = 1.19920E−03,
A6 = 1.13680E−05,    A8 = 0.00000E+00,
A10 = 0.00000E+00

[Variable Distances]

upon focusing on infinity
W: wide-angle end state,
M: intermediate focal length state,
T: telephoto end state

| | W | M | T |
|---|---|---|---|
| f= | 5.15 | 11.20 | 24.30 |
| d4= | 14.6976 | 5.1715 | 0.8000 |
| d12= | 4.1576 | 10.2330 | 23.3880 |
| d14= | 2.3545 | 2.3545 | 2.3545 |
| Bf= | 0.6000 | 0.6000 | 0.6000 |
| TL= | 33.7797 | 30.3290 | 39.1125 |

[Lens Group Data]

| Group | I | focal length |
|---|---|---|
| G1 | 1 | −11.85 |
| G2 | 6 | 9.55 |
| G3 | 13 | 21.05 |

TABLE 3-continued

[Values for Conditional Expressions]

(1) $(ft^2 \times Dw23)/(fw^2 \times TLw) = 2.7400$
(2) $ft/(-f1) = 2.0506$
(3) $(fw \times TLw)/(ft \times Ymax) = 1.8358$
(4) $Ndn + (0.05 \times vdn) = 3.417$
(5) $Ndn = 2.003$
(6) $(Rb + Ra)/(Rb - Ra) = -0.0836$ As seen above, Example 1-3 of the first embodiment satisfies conditional expressions (1) through (6).

Figure 6A:
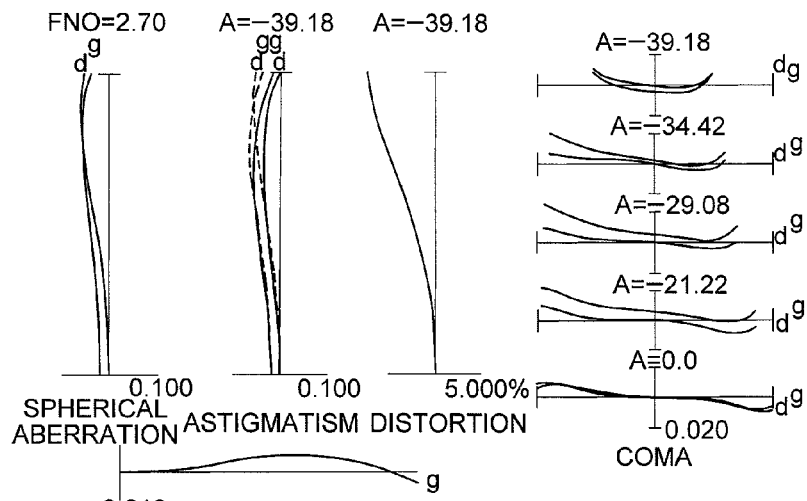
FIG. 6A is graphs showing various aberrations of the zoom lens according to the third example of the first embodiment in a wide-angle end state upon focusing on infinity.
Figure 6B:
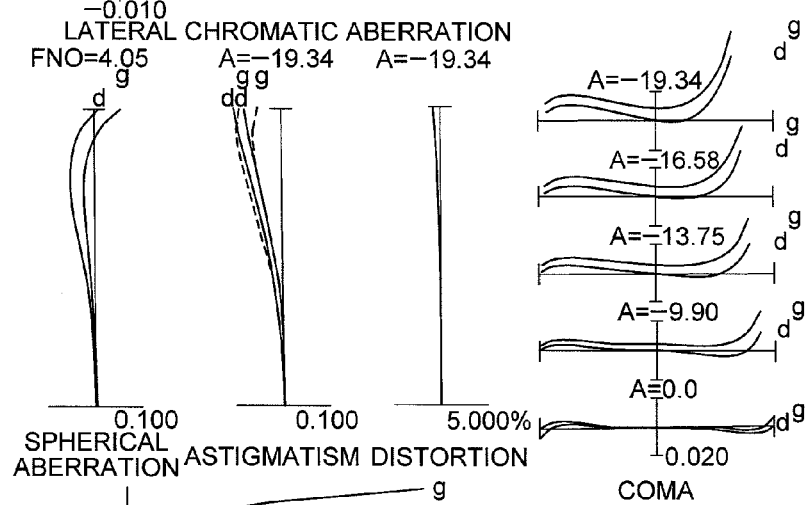
FIG. 6B is graphs showing various aberrations of the zoom lens according to the third example of the first embodiment in an intermediate focal length state upon focusing on infinity.
Figure 6C:
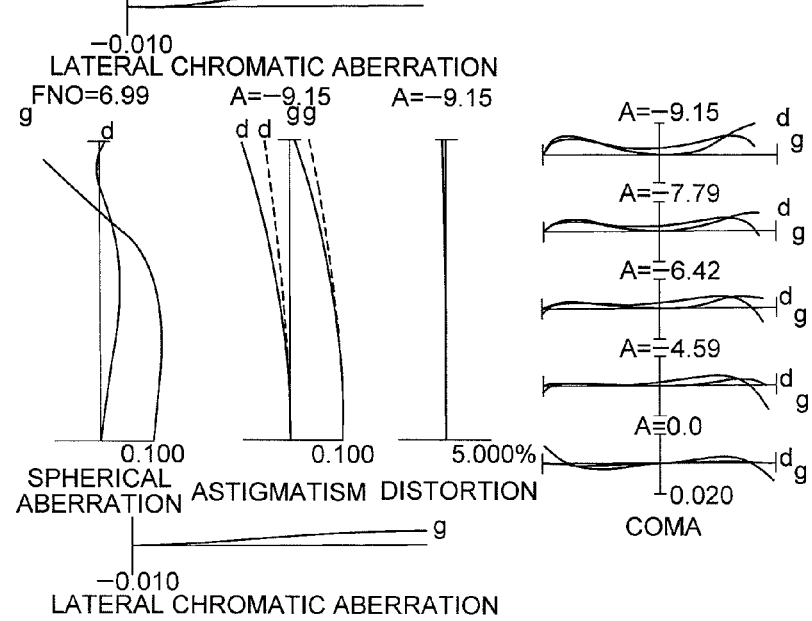
FIG. 6C is graphs showing various aberrations of the zoom lens according to the third example of the first embodiment in a telephoto end state upon focusing on infinity.

FIG. 6A is graphs showing various aberrations of the zoom lens ZL according to Example 1-3 of the first embodiment in a wide-angle end state (f=5.15 mm) upon focusing on infinity. FIG. 6B is graphs showing various aberrations of the zoom lens according to Example 1-3 of the first embodiment in an intermediate focal length state (f=11.20 mm) upon focusing on infinity. FIG. 6C is graphs showing various aberrations of the zoom lens according to Example 1-3 of the first embodiment in a telephoto end state (f=24.30 mm) upon focusing on infinity.

As is apparent from the respective graphs, the zoom lens ZL according to Example 1-3 of the first embodiment shows superb optical performance as a result of good corrections to various aberrations from the wide-angle end state through the telephoto end state. As a result, a digital still camera 1 equipped with the zoom lens ZL according to Example 1-3 of the first embodiment makes it possible to secure superb optical performance.

As described above, each example of the first embodiment makes it possible to provide a wide-angle zoom lens having a zoom ratio of about five, and excellent optical performance with making small in the total lens length upon retracting, and an optical apparatus (digital still camera) equipped therewith.

Then, an outline of another method for manufacturing a zoom lens ZL according to the first embodiment is explained below with reference to FIG. 9. Another method for manufacturing a zoom lens ZL according to the first embodiment shown in FIG. 9 is a method for manufacturing a zoom lens including, in order from an object side, a first lens group G1, a second lens group G2 and a third lens group G3, the method comprising steps of: disposing each lens in a lens barrel having a cylindrical shape in such a manner that the first lens group G1 has negative refractive power, the second lens group G2 has positive refractive power, and the third lens group G3 has positive refractive power (Step S101); and disposing each lens in such a manner that upon zooming from a wide-angle end state to a telephoto end state, a distance between the first lens group G1 and the second lens group G2 varies, and a distance between the second lens group G2 and the third lens group G3 varies, and the following conditional expression (1) is satisfied (Step S102):

$$2.4 < (ft^2 \times Dw23)/(fw^2 \times TLw) < 4.0 \quad (1)$$

where fw denotes a focal length of the zoom lens ZL in a wide-angle end state, Dw23 denotes a distance between the second lens group G2 and the third lens group G3 in the wide-angle end state, ft denotes a focal length of the zoom lens ZL in the telephoto end state, and TLw denotes a total lens length of the zoom lens ZL in the wide-angle end state.

With said another method for manufacturing a zoom lens according to the first embodiment, it becomes possible to manufacture a downsized zoom lens ZL having high optical performance.

In the above-described first embodiment, the following description may suitably be applied within limits that do not deteriorate optical performance.

In each Example of the first embodiment, although lens systems having a three-lens-group configuration has been shown, the above described lens configuration can be applied to other lens configurations such as a four-lens-group configuration and a five-lens-group configuration. A lens configuration in which a lens or a lens group is added to the most object side, and a lens configuration in which a lens or a lens group is added to the most image side may be possible. Incidentally, a lens group is at least one lens that is separated by air spaces which vary upon zooming.

In order to vary focusing from an infinity object to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that the third lens group is moved as the focusing lens group.

Moreover, a lens group or a portion of a lens group may be moved as a vibration reduction lens group in a direction including a component perpendicular to the optical axis, or tilted (swayed) on a plane including the optical axis thereby correcting an image blur caused by a camera shake. In particular, at least a portion of the second lens group is preferably made as a vibration reduction lens group.

Any lens surface may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the surface is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface.

A lens surface may be a diffractive optical surface, and a lens may be a graded-index type lens (GRIN lens) or a plastic lens.

Although an aperture stop is preferably disposed in the vicinity of the second lens group, the function may be substituted by a lens frame without disposing a member as an aperture stop.

Moreover, the lens surface of the lenses configuring the lens system may be coated with an, anti-reflection film having a high transmittance in a broad wave range. With this contrivance, it is feasible to attain the high contrast and the high optical performance by reducing a flare and ghost.

In the zoom lens ZL according to the first embodiment, the zoom ratio is about 4.5 to 6.0.

The first lens group G1 preferably includes one positive lens element and one negative lens element. In this instance, these lens elements are preferably disposed in the first lens group G1, in order from the object side, the negative lens element and the positive lens element. Moreover, the second lens group G2 preferably includes two positive lens elements and one negative lens element. In this instance, these lens elements are preferably disposed in the second lens group G2, in order from the object side, two positive lens elements and one negative lens element, or two positive lens elements, one negative lens element and one positive lens element. Furthermore, the third lens group G3 preferably includes one positive lens element.

Then, a zoom lens according to a second invention (hereinafter called as a second embodiment) is explained in detail.

[Second Embodiment]

A zoom lens according to a second embodiment is a negative leading type zoom lens that includes, in order from an object side, a first lens group having negative refractive power, a second lens group having positive refractive power, and a third lens group having positive refractive power, and upon zooming from a wide-angle end state to a telephoto end state, each distance between adjacent lens groups varies. The second lens group G2 is a varying magnification portion and a master lens group, and the first lens group G1 is a compensator group. The third lens group G3 optimizes the position of an exit pupil of the zoom lens with respect to the imaging device C, and corrects aberrations remained uncorrected by the first lens group G1 and the second lens group G2.

In order to accomplish both of a wider angle of view and a higher zoom ratio with using the zoom lens ZL having such a lens configuration, various conditions have to be satisfied. In particular, in order to carry out excellent aberration correction, lens configuration of each lens group, refractive power of each lens, positions of aspherical lenses have to be appropriately arranged. On the other hand, in consideration of a practical point of view, the dimension of the zoom lens has to be sufficiently downsized.

In a zoom lens according to the second embodiment, the following conditional expressions (7) and (8) are satisfied:

$$0.65 < f2 \cdot TLt/ft^2 < 0.92 \tag{7}$$

$$0.63 < ft \cdot Y\max/f1^2 < 0.80 \tag{8}$$

where f2 denotes a focal length of the second lens group, TLt denotes a total lens length of the zoom lens in the telephoto end state, ft denotes a focal length of the zoom lens in the telephoto end state, Ymax denotes the maximum image height, and f1 denotes a focal length of the first lens group.

Conditional expression (7) defines an appropriate range of the focal length, and the total lens length of the zoom lens and the focal length of the second lens group.

When the value $f2 \cdot TLt/ft^2$ falls below the lower limit of conditional expression (7), refractive power of the second lens group becomes excessively strong, and spherical aberration becomes difficult to be corrected, so that it is undesirable. When the value $f2 \cdot TLt/ft^2$ exceeds the upper limit of conditional expression (7), magnification of the second lens group in the telephoto end state becomes excessively large. Accordingly, it becomes difficult to correct spherical aberration and chromatic aberration, so that it is undesirable.

With satisfying conditional expression (7), it becomes possible to excellently correct aberrations with making the zoom ratio higher.

In order to secure the effect of the second embodiment, it is preferable to set the lower limit of conditional expression (7) to 0.69. In order to further secure the effect of the second embodiment, it is most preferable to set the lower limit of conditional expression (7) to 0.71. In order to secure the effect of the second embodiment, it is preferable to set the upper limit of conditional expression (7) to 0.90. In order to further secure the effect of the second embodiment, it is most preferable to set the upper limit of conditional expression (7) to 0.88.

Conditional expression (8) is for making the zoom lens a wider angle of view and a higher zoom ratio without deteriorating optical performance, and, in particular, defines an appropriate range of a focal length of the first lens group.

Here, a general construction of a zoom lens is briefly explained. The first lens group has a function to initially form an image of an object, and a position and a dimension of the image are determined by the focal length of the first lens group. The following lens groups carry out zooming with respect to the image formed by the first lens group, and finally form an image having desired dimension on an imaging device. Accordingly, it is very important for defining characteristics of the zoom lens to appropriately set the focal length of the first lens group.

When the value ft·Ymax/f1² falls below the lower limit of conditional expression (8), the distance along the optical axis between the first lens group and the second lens group in the telephoto end state comes close. In order to avoid contact of both lens groups, a principal point of the second lens group has to be moved toward the object side. For this purpose, the second lens group has to be configured to have a refractive power distribution of an extreme telephoto type. As a result, spherical aberration becomes very difficult to be corrected, so that it is undesirable. When the value ft·Ymax/f1² exceeds the upper limit of conditional expression (8), refractive power of the first lens group becomes excessively small, and coma in the wide-angle end state becomes difficult to be corrected, so that it is undesirable.

In order to secure the effect of the second embodiment, it is preferable to set the lower limit of conditional expression (8) to 0.64. In order to further secure the effect of the second embodiment, it is most preferable to set the lower limit of conditional expression (8) to 0.66. In order to secure the effect of the second embodiment, it is preferable to set the upper limit of conditional expression (8) to 0.77. In order to further secure the effect of the second embodiment, it is most preferable to set the upper limit of conditional expression (8) to 0.74.

In a zoom lens according to the second embodiment, the following conditional expression (9) is preferably satisfied:

$$0.85 < f2/(fw \cdot ft)^{1/2} < 0.95 \qquad (9)$$

where fw denotes a focal length of the zoom lens in the wide-angle end state.

Conditional expression (9) defines an appropriate range of the focal length of the second lens group.

When the value f2/(fw·ft)^{1/2} falls below the lower limit of conditional expression (9), refractive power of the second lens group becomes excessively strong, so that spherical aberration becomes difficult to be corrected. Accordingly, it is undesirable. When the value f2/(fw·ft)^{1/2} exceeds the upper limit of conditional expression (9), magnification of the second lens group in the telephoto end state becomes excessively large, so that spherical aberration and chromatic aberration in the telephoto end state become difficult to be corrected. Accordingly, it is undesirable.

In order to secure the effect of the second embodiment, it is preferable to set the lower limit of conditional expression (9) to 0.87. In order to further secure the effect of the second embodiment, it is most preferable to set the lower limit of conditional expression (9) to 0.89. In order to secure the effect of the second embodiment, it is preferable to set the upper limit of conditional expression (9) to 0.93. In order to further secure the effect of the second embodiment, it is most preferable to set the upper limit of conditional expression (9) to 0.92.

In a zoom lens according to the second embodiment, the following conditional expression (10) is preferably satisfied:

$$0.055 < (Nnav-1.50)fw/TLw < 0.150 \qquad (10)$$

where Nnav denotes an average of a refractive index at d-line (wavelength λ=587.6 nm) of all negative lenses included in the zoom lens, fw denotes a focal length of the zoom lens in the wide-angle end state, TLw denotes a total lens length of the zoom lens in the wide-angle end state.

Conditional expression (10) is for excellently correcting curvature of sagittal image plane in the wide-angle end state.

When the value (Nnav−1.50)·fw/TLw falls below the lower limit of conditional expression (10), curvature of sagittal image plane in the wide-angle end state becomes large, so that optical performance on the corner of the image frame becomes worse. Accordingly, it is undesirable. When the value (Nnav−1.50)·fw/TLw exceeds the upper limit of conditional expression (10), Petzval sum becomes large, so that curvature of field and astigmatic difference in the intermediate focal length become difficult to be corrected. Accordingly, it is undesirable.

In order to secure the effect of the second embodiment, it is preferable to set the lower limit of conditional expression (10) to 0.058. In order to further secure the effect of the second embodiment, it is most preferable to set the lower limit of conditional expression (10) to 0.060. In order to secure the effect of the second embodiment, it is preferable to set the upper limit of conditional expression (10) to 0.100. In order to further secure the effect of the second embodiment, it is most preferable to set the upper limit of conditional expression (10) to 0.075.

In a zoom lens according to the second embodiment, the third lens group is composed of only a single positive lens, and the following conditional expression (11) is preferably satisfied:

$$-0.30 < (R32+R31)/(R32-R31) < 1.10 \qquad (11)$$

where R31 denotes a paraxial radius of curvature of the object side lens surface of the positive lens in the third lens group, and R32 denotes a paraxial radius of curvature of the image side lens surface of the positive lens in the third lens group.

Conditional expression (11) defines an appropriate range of a shape of the positive lens composing the third lens group.

When the value (R32+R31)/(R32−R31) falls below the lower limit of conditional expression (11), curvature of field in the telephoto end state becomes difficult to be corrected, so that it is undesirable. When the value (R32+R31)/(R32−R31) exceeds the upper limit of conditional expression (11), curvature of field in the intermediate focal length state becomes difficult to be corrected, so that it is undesirable.

In order to secure the effect of the second embodiment, it is preferable to set the lower limit of conditional expression (11) to −0.10. In order to further secure the effect of the second embodiment, it is most preferable to set the lower limit of conditional expression (11) to 0.00. In order to secure the effect of the second embodiment, it is preferable to set the upper limit of conditional expression (11) to 0.95. In order to further secure the effect of the second embodiment, it is most preferable to set the upper limit of conditional expression (11) to 0.80.

In a zoom lens according to the second embodiment, the first lens group preferably includes, in order from the object side along the optical axis, at least one negative lens and one positive lens.

With constructing the first lens group in this manner, it becomes possible to excellently correct chromatic aberration, astigmatic difference, and coma in the wide-angle end state.

In a zoom lens according to the second embodiment, the most object side lens in the first lens group has an aspherical surface.

With making the most object side lens in the first lens group an aspherical lens, it becomes possible to excellently correct coma and astigmatic difference in the wide-angle end state.

In a zoom lens according to the second embodiment, the second lens group preferably includes, in order from the object side along the optical axis, two positive lenses and one negative lens.

With this lens configuration, it becomes possible to move the principal point of the second lens group toward the object side. Accordingly, the first lens group and the second lens group can be prevent from contact with each other in the telephoto end state, and spherical aberration can be corrected excellently.

In a zoom lens according to the second embodiment, the most object side lens surface of the second lens group is preferably an aspherical surface.

With making the most object side lens surface an aspherical surface, spherical aberration can be corrected excellently.

In a zoom lens according to the second embodiment, upon zooming from the wide-angle end state to the telephoto end state, the third lens group is preferably fixed on the optical axis.

With fixing the third lens group, variation in exit pupil position upon zooming can be made small.

In a zoom lens according to the second embodiment, at least the first lens group and the second lens group are preferably moved upon zooming from the wide-angle end state to the telephoto end state such that a distance between the first lens group and the second lens group decreases, and a distance between the second lens group and the third lens group increases. With this lens configuration, a higher zoom ratio can be obtained.

In a zoom lens according to the second embodiment, focusing from an infinity object to a close object may be carried out by moving the first lens group or the third lens group toward the object side. However, the method moving the first lens group toward the object side tends to reduce light amount on the periphery of the image frame upon focusing on the closest shooting range, so that it is most preferable that the third lens group G3 is moved toward the object side upon focusing.

In a zoom lens according to the second embodiment, any lens surface may be a diffractive optical surface, and any lens may be a graded-index type lens (GRIN lens) or a plastic lens. A lens group having small refractive power may be attached to the image side on the third lens group.

In a zoom lens according to the second embodiment, a lens group or a portion of a lens group may be moved in a direction including a component perpendicular to the optical axis. With this lens configuration, a vibration reduction lens group can be realized.

Moreover, a method for manufacturing a zoom lens according to the second embodiment is a method for manufacturing a zoom lens including, in order from an object side, a first lens group, a second lens group, and a third lens group, comprising steps of: disposing each lens in such a manner that the first lens group has negative refractive power, the second lens group has positive refractive power, and the third lens group has positive refractive power; and disposing the first lens group through the third lens group in such a manner that a distance between the first lens group and the second lens group varies, and a distance between the second lens group and the third lens group varies, and the following conditional expressions (7) and (8) are satisfied:

$$0.65 < f2 \cdot TLt/ft^2 < 0.92 \quad (7)$$

$$0.63 < ft \cdot Ymax/f1^2 < 0.80 \quad (8)$$

where f2 denotes a focal length of the second lens group, TLt denotes a total lens length of the zoom lens in the telephoto end state, ft denotes a focal length of the zoom lens in the telephoto end state, Ymax denotes the maximum image height, and f1 denotes a focal length of the first lens group.

With this method for manufacturing a zoom lens according to the second embodiment, it becomes possible to provide a method for manufacturing a downsized zoom lens having excellent optical performance with accomplishing a wider angle of view and a higher zoom ratio suitable for a solid-state imaging device.

In a method for manufacturing a zoom lens according to the second embodiment, the method preferably includes a step of: satisfying the following conditional expression (9):

$$0.85 < f2/(fw \cdot ft)^{1/2} < 0.95 \quad (9)$$

where fw denotes a focal length of the zoom lens in the wide-angle end state.

With this method for manufacturing a zoom lens according to the second embodiment, it becomes possible to provide a method for manufacturing a downsized zoom lens having excellent optical performance with accomplishing a wider angle of view and a higher zoom ratio suitable for a solid-state imaging device.

In a method for manufacturing a zoom lens according to the second embodiment, the method preferably includes a step of: satisfying the following conditional expression (10):

$$0.055 < (Nnav - 1.50) fw/TLw < 0.150 \quad (10)$$

where Nnav denotes an average of a refractive index at d-line (wavelength $\lambda$=587.6 nm) of all negative lenses included in the zoom lens, fw denotes a focal length of the zoom lens in the wide-angle end state, TLw denotes a total lens length of the zoom lens in the wide-angle end state.

With this method for manufacturing a zoom lens according to the second embodiment, it becomes possible to provide a method for manufacturing a downsized zoom lens having excellent optical performance with accomplishing a wider angle of view and a higher zoom ratio suitable for a solid-state imaging device.

EXAMPLES OF THE SECOND EMBODIMENT

Each example according to the second embodiment is explained below with reference to accompanying drawings.

Example 2-1

FIG. 10 is a sectional view showing a lens configuration of a zoom lens according to a first example (Example 2-1) of a second embodiment.

The zoom lens according to Example 2-1 of the second embodiment is composed of, in order from an object side along an optical axis, a first lens group G1 having negative refractive power as a whole, a second lens group G2 having positive refractive power as a whole, and a third lens group G3 having positive refractive power. Upon zooming from a wide-angle end state W to a telephoto end state T, the first lens group G1 and the second lens group G2 are moved and the third lens group G3 is fixed in such a manner that a distance between the first lens group G1 and the second lens group G2 decreases, and a distance between the second lens group G2 and the third lens group G3 increases.

The first lens group G1 is composed of, in order from the object side along the optical axis, a negative lens L11 and a positive lens L12. Each of the object side surface and the image side surface of the negative lens L11 is an aspherical surface.

The second lens group G2 is composed of, in order from the object side along the optical axis, a positive lens L21, a positive lens L22, a negative lens L23, and a positive lens L24, and the positive lens L22 and the negative lens L23 are cemented with each other, and each of the object side surface and the image side surface of the positive lens L21 is an aspherical surface.

The third lens group is composed of only one positive lens L31.

Moreover, an f-number defining member S is disposed to the image plane I side of a vertex on the optical axis of the positive lens L21 in the second lens group G2, and moved in a body with the second lens group G2 upon zooming from the wide-angle end state W to the telephoto end state T.

A filter group FL is composed of a low-pass filter, an infrared-light-blocking filter, and the like.

Various values associated with a zoom lens according to Example 2-1 of the second embodiment are listed in Table 4.

In [Surface Data], OBJECT is an object plane, i denotes an optical surface number counted in order from the object side, r denotes a radius of curvature of a lens surface, d denotes a face-to-face distance along an optical axis, nd denotes a refractive index at d-line (wavelength λ=587.6 nm), and νd denotes an Abbe number at d-line (wavelength λ=587.6 nm), (variable) denotes a variable distance, S denotes an f-number defining member, and Image denotes an image plane I. A refractive index of the air nd=1.000000 is omitted, and "r=∞" indicates a plane surface.

In [Aspherical Surface Data], an aspherical surface is expressed by the following expression (B):

$$X(y)=(y^2/r)/[1+\{1-\kappa\times(y/r)^2\}^{1/2}]+A4\times y^4+A6\times y^6+A8\times y^8+A10\times y^{10}+\ldots \quad (B)$$

where "y" denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and An denotes an aspherical coefficient of n-th order (n=4, 6, 8, 10). In each example, the second order aspherical coefficient A2 is zero, so that A2 is omitted. In [Aspherical Surface Data], "E-n" denotes "×10$^{-n}$", and for example "1.234E-05" denotes "1.234×10$^{-5}$". In [Surface Data], the notation "*" attached to the right side of a surface number shows that the lens surface is an aspherical surface.

In [Various Data], zoom ratio is a zoom ratio of a zoom lens, W denotes a wide-angle end state, M denotes an intermediate focal length state, T denotes a telephoto end state, f denotes a focal length, FNO denotes an f-number, ω denotes a half angle of view (unit: degree), Y denotes an image height (the maximum image height Ymax=3.9 in Examples 2-1 through 2-4), TL denotes a total lens length of the zoom lens, Bf denotes a back focal length, and di denotes a variable distance of the surface number i.

In [Lens Group Data], a start surface number I and a focal length of each lens group are shown.

In [Values for Conditional Expressions], corresponding values for respective conditional expressions are shown.

In respective tables for various values shown in the second embodiment, "mm" is generally used for the unit of length such as the focal length f, the radius of curvature r and the distance to the next lens surface d. However, since similar optical performance can be obtained by an optical system proportionally enlarged or reduced its dimension, the unit is not necessarily to be limited to "mm". The explanation of reference symbols is the same in the other Examples.

TABLE 4

[Surface Data]

| i | r | d | nd | νd |
|---|---|---|---|---|
| OBJECT | ∞ | ∞ | | |
| 1* | 24.1229 | 0.9000 | 1.80139 | 45.46 |
| 2* | 4.1951 | 2.3000 | | |
| 3 | 7.8240 | 1.7000 | 1.80809 | 22.79 |
| 4 | 14.3683 | (variable) | | |
| 5 | ∞ | −0.4000 | f-number defining member S | |
| 6* | 5.6658 | 1.3500 | 1.78676 | 45.19 |
| 7* | 53.1047 | 0.1000 | | |
| 8 | 5.0510 | 1.5000 | 1.75500 | 52.29 |
| 9 | ∞ | 0.4000 | 2.00330 | 28.27 |
| 10 | 3.3430 | 0.6000 | | |
| 11 | 19.8272 | 1.3000 | 1.51823 | 58.89 |
| 12 | −12.7168 | (variable) | | |
| 13 | 19.1057 | 1.5000 | 1.62299 | 58.22 |
| 14 | −39.6483 | (variable) | | |
| 15 | ∞ | 0.2100 | 1.51680 | 64.12 |
| 16 | ∞ | 0.5000 | | |
| 17 | ∞ | 0.5000 | 1.51680 | 64.12 |
| 18 | ∞ | (Bf) | | |
| Image | ∞ | | | |

[Aspherical Surface Data]

Surface Number: 1

κ = −44.9064　　　　　　A4 = 5.90330−05
A6 = 0.00000E+00　　　 A8 = 0.00000E+00
A10 = 0.00000E+00

Surface Number: 2

κ = 0.0899　　　　　　　A4 = 1.36940E−04
A6 = 1.56960E−05　　　 A8 = −2.57140E−07
A10 = 6.20230E−09

Surface Number: 6

κ = 0.4140　　　　　　　A4 = 1.14670E−04
A6 = 1.12420E−06　　　 A8 = 0.00000E+00
A10 = 0.00000E+00

Surface Number: 7

κ = 8.8706　　　　　　　A4 = 2.67270E−05
A6 = 0.00000E+00　　　 A8 = 0.00000E+00
A10 = 0.00000E+00

[Various Data]

Zoom Ratio = 3.7669

| | W | M | T |
|---|---|---|---|
| f= | 5.15 | 10.00 | 19.40 |
| FNO= | 2.81 | 3.95 | 6.17 |
| ω= | 38.55 | 21.36 | 11.31 |
| Y= | 3.9 | 3.9 | 3.9 |
| TL= | 32.0035 | 29.4321 | 35.2988 |
| Bf= | 0.6000 | 0.6000 | 0.6000 |
| d4= | 12.4529 | 4.8312 | 0.9098 |
| d12= | 5.8335 | 9.8837 | 19.6718 |
| d14= | 1.6572 | 1.6572 | 1.6572 |

[Lens Group Data]

| Group | I | focal length |
|---|---|---|
| 1 | 1 | −10.81 |
| 2 | 6 | 9.18 |
| 3 | 13 | 20.90 |

[Values for Conditional Expressions]

(7) $f2 \cdot TLt/ft^2$ = 0.8610
(8) $ft \cdot Ymax/f1^2$ = 0.6475
(9) $f2/(fw \cdot ft)^{1/2}$ = 0.9184

TABLE 4-continued

(10) (Nnav − 1.50) fw/TLw = 0.0647
(11) (R32 + R31)/(R32 − R31) = 0.3496

Figure 11A:
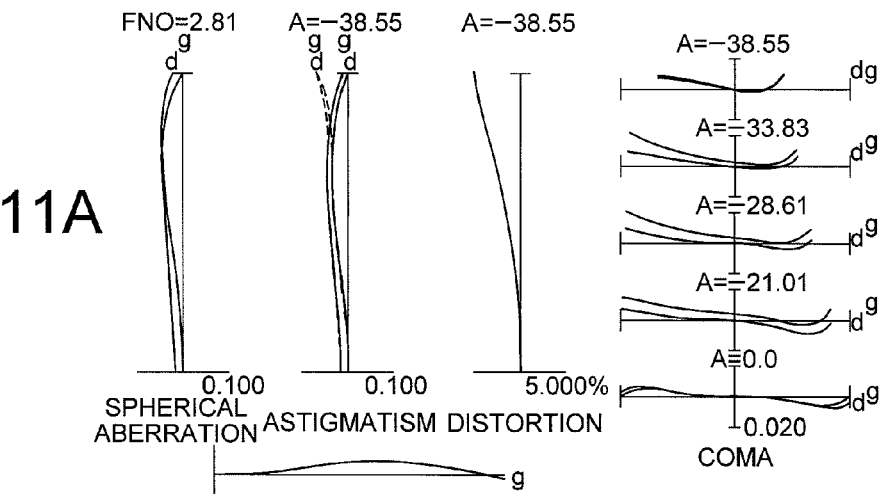
FIG. 11A is graphs showing various aberrations of the zoom lens according to the first example of the second embodiment in a wide-angle end state upon focusing on infinity.
Figure 11B:
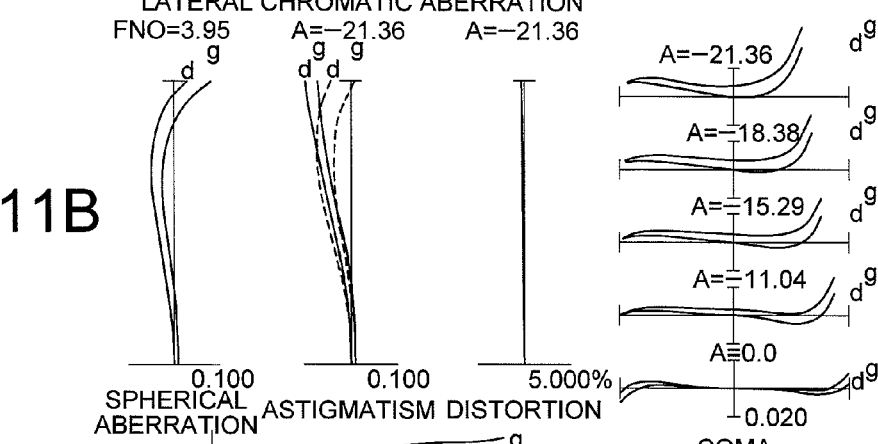
FIG. 11B is graphs showing various aberrations of the zoom lens according to the first example of the second embodiment in an intermediate focal length state upon focusing on infinity.
Figure 11C:
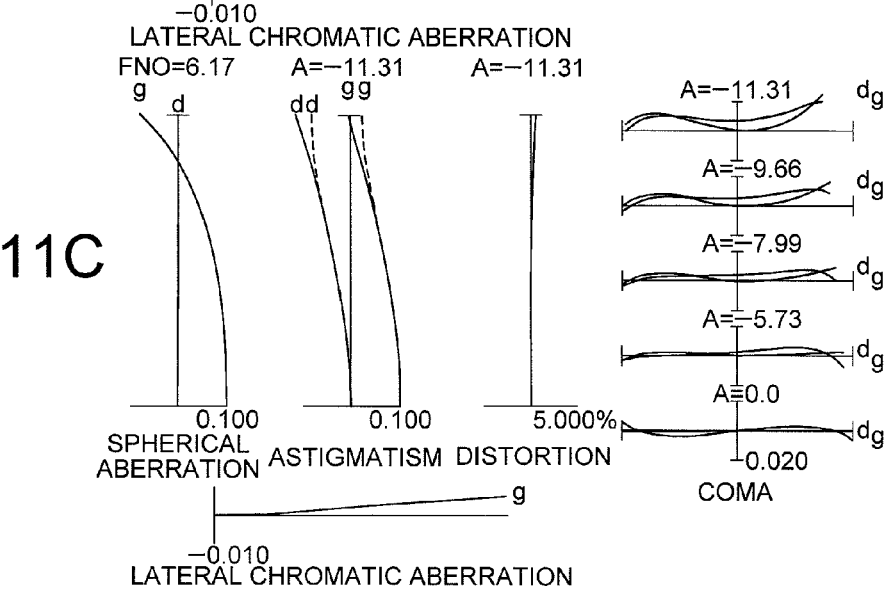
FIG. 11C is graphs showing various aberrations of the zoom lens according to the first example of the second embodiment in a telephoto end state upon focusing on infinity.

FIG. 11A is graphs showing various aberrations of the zoom lens according to Example 2-1 of the second embodiment in a wide-angle end state upon focusing on infinity. FIG. 11B is graphs showing various aberrations of the zoom lens according to Example 2-1 of the second embodiment in an intermediate focal length state upon focusing on infinity. FIG. 11C is graphs showing various aberrations of the zoom lens according to Example 2-1 of the second embodiment in a telephoto end state upon focusing on infinity.

In respective graphs, FNO denotes an f-number, and A denotes a half angle of view (unit: degree). Ln respective graphs showing spherical aberration, an f-number with respect to the maximum aperture is shown. In graphs showing coma, each value with respect to a half angle of view is shown. In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane. In graphs showing coma, a solid line shows meridional coma. The above-described explanation regarding various aberration graphs is the same as the following Examples according to the second embodiment and duplicated explanations are omitted.

As is apparent from the respective graphs, the zoom lens ZL according to Example 2-1 of the second embodiment shows superb optical performance as a result of good corrections to various aberrations from the wide-angle end state through the telephoto end state.

Example 2-2

Figure 12:
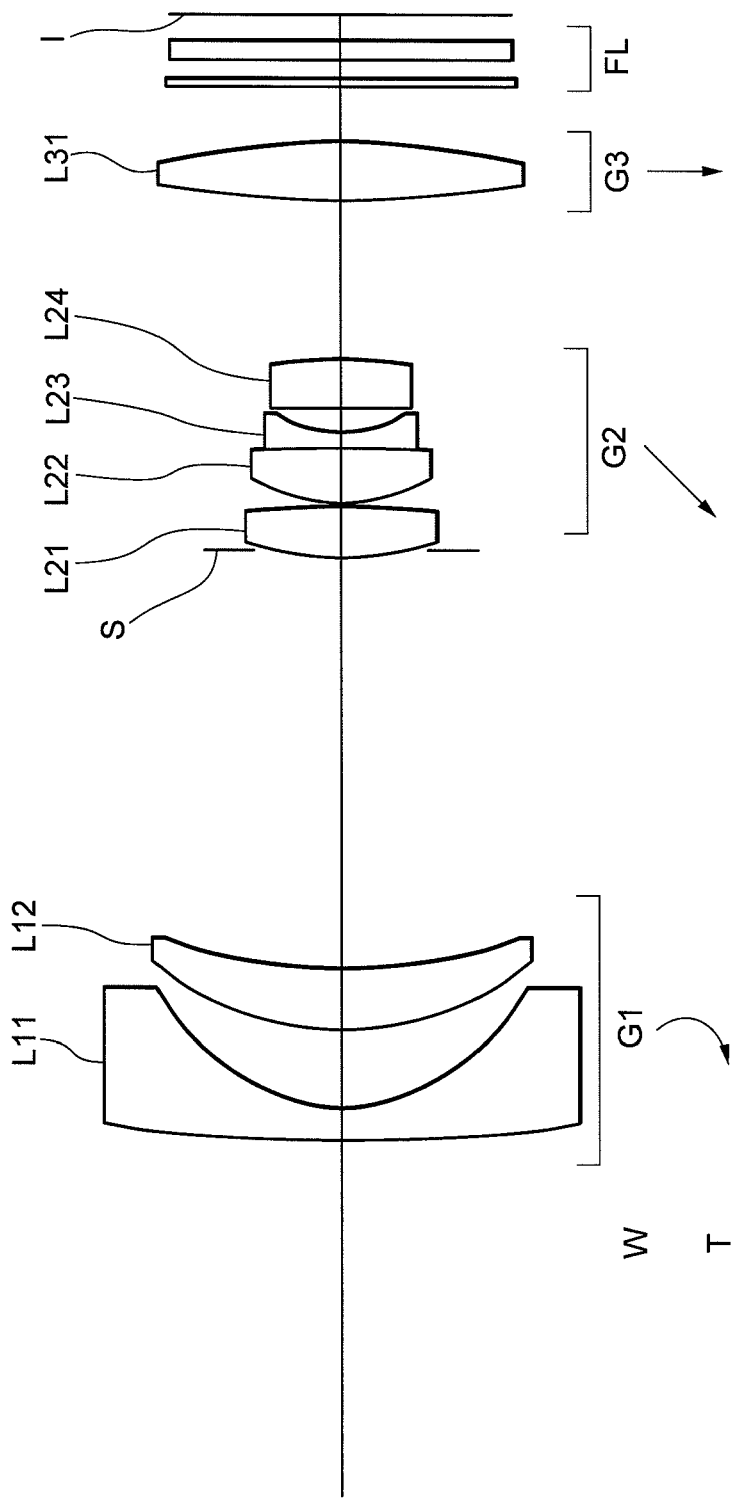
FIG. 12 is a sectional view showing a lens configuration of a zoom lens according to a second example of the second embodiment.

FIG. 12 is a sectional view showing a lens configuration of a zoom lens according to Example 2-2 of the second embodiment.

The zoom lens according to Example 2-2 of the second embodiment is composed of, in order from an object side along an optical axis, a first lens group G1 having negative refractive power as a whole, a second lens group G2 having positive refractive power as a whole, and a third lens group G3 having positive refractive power. Upon zooming from a wide-angle end state W to a telephoto end state T, the first lens group G1 and the second lens group G2 are moved and the third lens group G3 is fixed in such a manner that a distance between the first lens group G1 and the second lens group G2 decreases, and a distance between the second lens group G2 and the third lens group G3 increases.

The first lens group G1 is composed of, in order from the object side along the optical axis, a negative lens L11 and a positive lens L12. Each of the object side surface and the image side surface of the negative lens L11 is an aspherical surface.

The second lens group G2 is composed of, in order from the object side along the optical axis, a positive lens L21, a positive lens L22, a negative lens L23, and a positive lens L24, and the positive lens L22 and the negative lens L23 are cemented with each other, and each of the object side surface and the image side surface of the positive lens L21 is an aspherical surface.

The third lens group G3 is composed of only one positive lens L31.

Moreover, an f-number defining member S is disposed to the image plane I side of a vertex on the optical axis of the positive lens L21 in the second lens group G2, and moved in a body with the second lens group G2 upon zooming from the wide-angle end state W to the telephoto end state T.

A filter group FL is composed of a low-pass filter, an infrared-light-blocking filter, and the like.

Various values associated with a zoom lens according Example 2-2 of the second embodiment are listed in Table 5.

TABLE 5

[Surface Data]

| i | r | d | nd | vd |
|---|---|---|---|---|
| OBJECT | ∞ | ∞ | | |
| 1* | 37.7710 | 0.8500 | 1.80139 | 45.46 |
| 2* | 4.4272 | 2.0500 | | |
| 3 | 7.3731 | 1.6000 | 1.80810 | 22.76 |
| 4 | 13.1164 | (variable) | | |
| 5 | ∞ | −0.3000 | f-number defining member S | |
| 6* | 6.5732 | 1.3500 | 1.78676 | 45.19 |
| 7* | −47.7113 | 0.1000 | | |
| 8 | 4.2494 | 1.4500 | 1.75500 | 52.29 |
| 9 | −301.4722 | 0.4000 | 2.00330 | 28.27 |
| 10 | 3.0371 | 0.6500 | | |
| 11 | 103.3664 | 1.3000 | 1.51823 | 58.89 |
| 12 | −13.3078 | (variable) | | |
| 13 | 25.6970 | 1.5500 | 1.62299 | 58.22 |
| 14 | −21.4375 | (variable) | | |
| 15 | ∞ | 0.2100 | 1.51680 | 64.12 |
| 16 | ∞ | 0.5000 | | |
| 17 | ∞ | 0.5000 | 1.51680 | 64.12 |
| 18 | ∞ | (Bf) | | |
| Image | ∞ | | | |

[Aspherical Surface Data]

Surface Number: 1

κ = −99.0000           A4 = 9.31110E−05
A6 = −1.75670E−07      A8 = 0.00000E+00
A10 = 0.00000E+00

Surface Number: 2

κ = 0.1793             A4 = 3.27140E−04
A6 = 1.85680E−05       A8 = −3.84840E−07
A10 = 1.47580E−08

Surface Number: 6

κ = −3.1987            A4 = 1.56090E−03
A6 = −1.03890E−04      A8 = 0.00000E+00
A10 = 0.00000E+00

Surface Number: 7

κ = −70.7606           A4 = 1.35220E−04
A6 = −6.82730E−05      A8 = 0.00000E+00
A10 = 0.00000E+00

[Various Data]

Zoom Ration = 3.7669

| | W | M | T |
|---|---|---|---|
| f= | 5.15 | 10.00 | 19.40 |
| FNO= | 2.75 | 3.91 | 6.16 |
| ω= | 39.93 | 21.51 | 11.40 |
| Y= | 3.9 | 3.9 | 3.9 |
| TL= | 29.6780 | 27.6726 | 33.5625 |
| Bf= | 0.6000 | 0.6000 | 0.6000 |
| d4= | 11.2103 | 4.3428 | 0.8095 |
| d12= | 4.1729 | 9.0349 | 18.4581 |
| d14= | 1.4849 | 1.4849 | 1.4849 |

TABLE 5-continued

[Lens Group Data]

| Group | I | focal length |
|---|---|---|
| 1 | 1 | −10.45 |
| 2 | 6 | 8.55 |
| 3 | 13 | 19.00 |

[Values for Conditional Expressions]

Figure 13A:
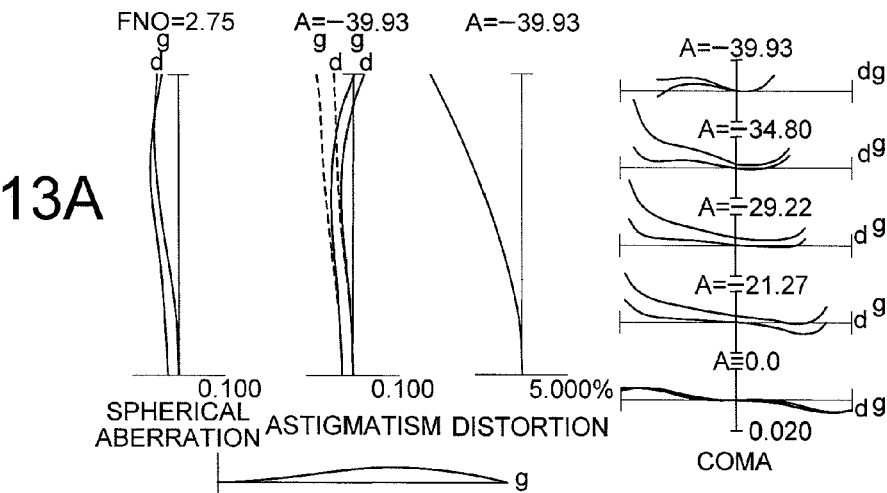
FIG. 13A is graphs showing various aberrations of the zoom lens according to the second example of the second embodiment in a wide-angle end state upon focusing on infinity.
Figure 13B:
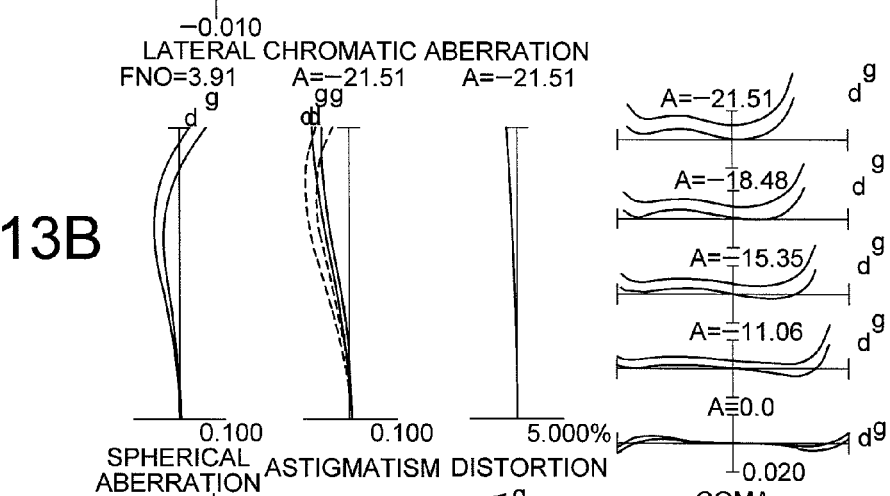
FIG. 13B is graphs showing various aberrations of the zoom lens according to the second example of the second embodiment in an intermediate focal length state upon focusing on infinity.
Figure 13C:
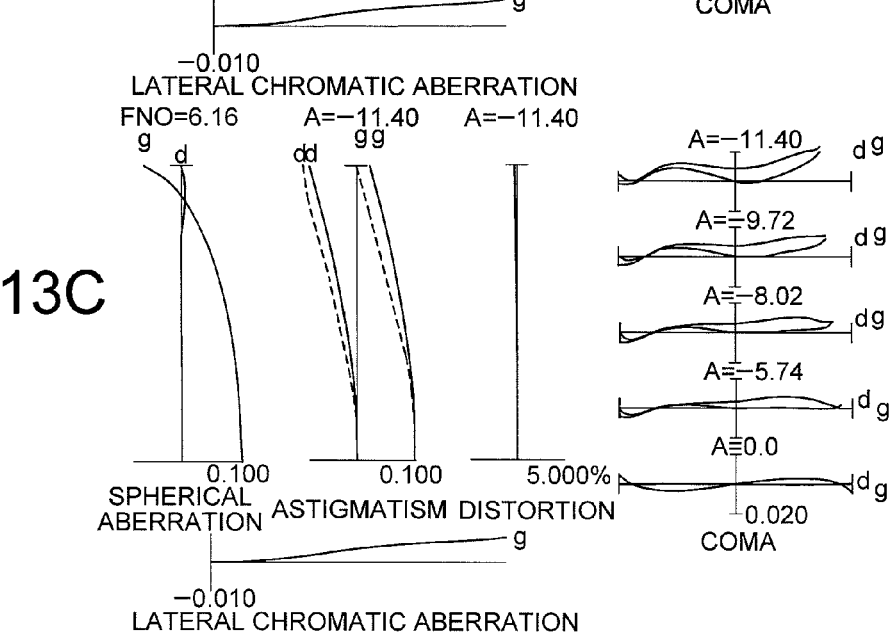
FIG. 13C is graphs showing various aberrations of the zoom lens according, to the second example of the second embodiment in a telephoto end state upon focusing on infinity.

(7) $f2 \cdot TLt/ft^2 = 0.7625$
(8) $ft \cdot Ymax/fl^2 = 0.6928$
(9) $f2/(fw \cdot ft)^{1/2} = 0.8554$
(10) $(Nnav - 1.50) fw/TLw = 0.0698$
(11) $(R32 + R31)/(R32 - R31) = 0.0904$ FIG. 13A is graphs showing various aberrations of the zoom lens according to Example 2-2 of the second embodiment in a wide-angle end state upon focusing on infinity. FIG. 13B is graphs showing various aberrations of the zoom lens according to Example 2-2 of the second embodiment in an intermediate focal length state upon focusing on infinity. FIG. 13C is graphs showing various aberrations of the zoom lens according to Example 2-2 of the second embodiment in a telephoto end state upon focusing on infinity.

As is apparent from the respective graphs, the zoom lens ZL according to Example 2-2 of the second embodiment shows superb optical performance as a result of good corrections to various aberrations from the wide-angle end state through the telephoto end state.

Example 2-3

Figure 14:
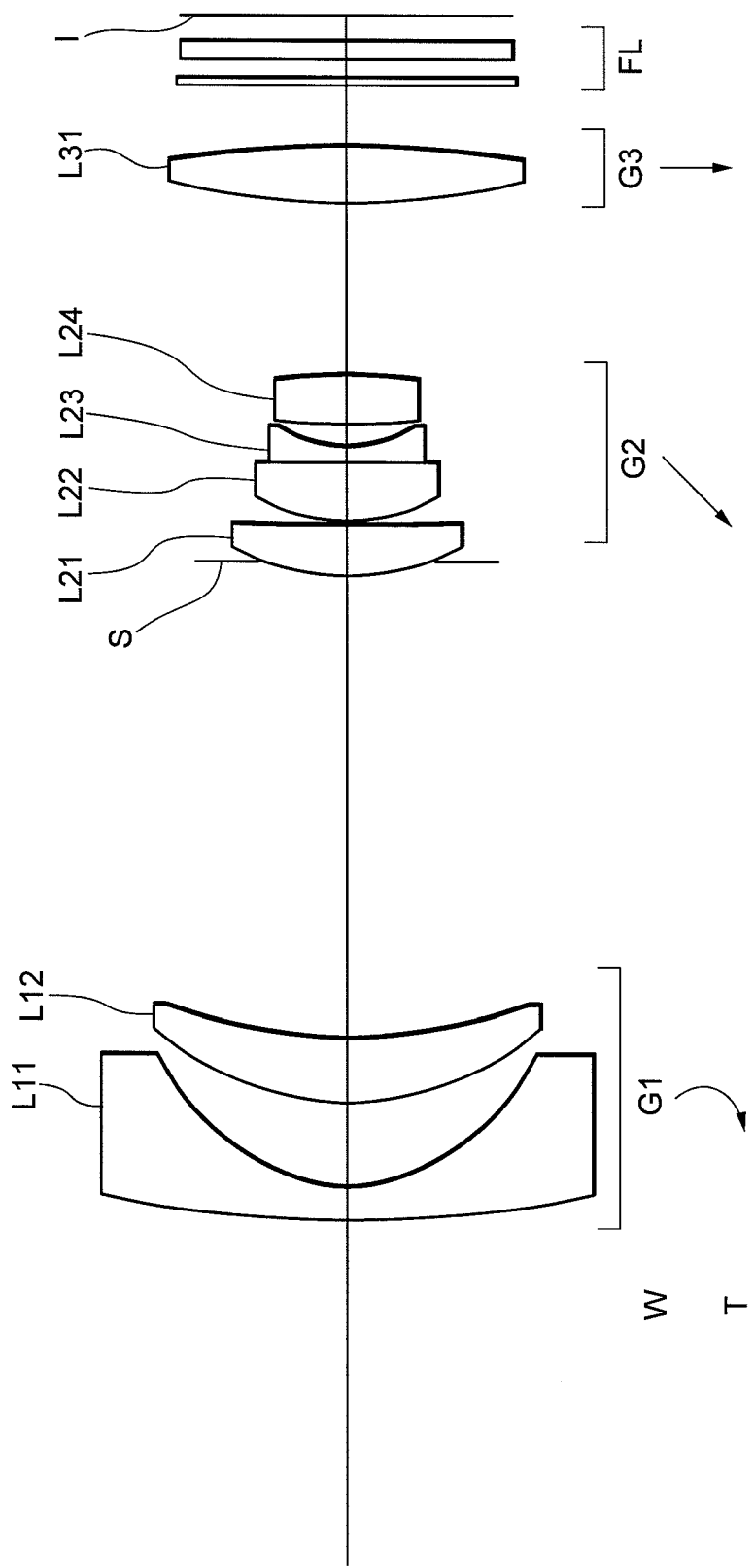
FIG. 14 is a sectional view showing a lens configuration of a zoom lens according to a third example of the second embodiment.

FIG. 14 is a sectional view showing a lens configuration of a zoom lens according to Example 2-3 of the second embodiment.

The zoom lens according to Example 2-3 of the second embodiment is composed of, in order from an object side along an optical axis, a first lens group G1 having negative refractive power as a whole, a second lens group G2 having positive refractive power as a whole, and a third lens group G3 having positive refractive power. Upon zooming from a wide-angle end state W to a telephoto end state T, the first lens group G1 and the second lens group G2 are moved and the third lens group G3 is fixed in such a manner that a distance between the first lens group G1 and the second lens group G2 decreases, and a distance between the second lens group G2 and the third lens group G3 increases.

The first lens group G1 is composed of, in order from the object side along the optical axis, a negative lens L11 and a positive lens L12. Each of the object side surface and the image side surface of the negative lens L11 is an aspherical surface.

The second lens group G2 is composed of, in order from the object side along the optical axis, a positive lens L21, a positive lens L22, a negative lens L23, and a positive lens L24, and the positive lens L22 and the negative lens L23 are cemented with each other, and each of the object side surface and the image side surface of the positive lens L21 is an aspherical surface.

The third lens group is composed of only one positive lens L31.

Moreover, an f-number defining member S is disposed to the image plane I side of a vertex on the optical axis of the positive lens L21 in the second lens group G2, and moved in a body with the second lens group G2 upon zooming from the wide-angle end state W to the telephoto end state T.

A filter group FL is composed of a low-pass filter, an infrared-light-blocking filter, and the like.

Various values associated with a zoom lens according Example 2-3 of the second embodiment are listed in Table 6.

TABLE 6

[Surface Data]

| i | r | d | nd | vd |
|---|---|---|---|---|
| OBJECT | ∞ | ∞ | | |
| 1* | 23.3692 | 0.9000 | 1.80139 | 45.46 |
| 2* | 4.2913 | 2.3000 | | |
| 3 | 7.6279 | 1.7500 | 1.80809 | 22.79 |
| 4 | 13.1294 | (variable) | | |
| 5 | ∞ | −0.4000 | f-number defining member S | |
| 6* | 6.2120 | 1.4000 | 1.78676 | 45.19 |
| 7* | 70.7134 | 0.1000 | | |
| 8 | 4.8560 | 1.6000 | 1.75500 | 52.29 |
| 9 | ∞ | 0.4000 | 2.00330 | 28.27 |
| 10 | 3.3761 | 0.6500 | | |
| 11 | 20.0864 | 1.3000 | 1.53270 | 56.19 |
| 12 | −14.2963 | (variable) | | |
| 13 | 19.4357 | 1.5000 | 1.62299 | 58.22 |
| 14 | −38.2788 | (variable) | | |
| 15 | ∞ | 0.2100 | 1.51680 | 64.12 |
| 16 | ∞ | 0.5000 | | |
| 17 | ∞ | 0.5000 | 1.51680 | 64.12 |
| 18 | ∞ | (Bf) | | |
| Image | ∞ | | | |

[Aspherical Surface Data]

Surface Number: 1

κ = −27.7837
A6 = 0.00000E+00
A10 = 0.00000E+00
A4 = 6.12390E−05
A8 = 0.00000E+00

Surface Number: 2

κ = 0.1321
A6 = 1.16840E−05
A10 = 5.01830E−09
A4 = 2.42920E−04
A8 = −1.31270E−07

Surface Number: 6

κ = 0.2828
A6 = −1.30100E−06
A10 = 0.00000E+00
A4 = 1.80730E−04
A8 = 0.00000E+00

Surface Number: 7

κ = −44.5246
A6 = 0.00000E+00
A10 = 0.00000E+00
A4 = 4.64040E−05
A8 = 0.00000E+00

[Various Data]

Zoom Ration = 4.0194

| | W | M | T |
|---|---|---|---|
| f= | 5.15 | 10.30 | 20.70 |
| FNO= | 2.71 | 3.87 | 6.22 |
| ω= | 38.56 | 20.77 | 10.62 |
| Y= | 3.9 | 3.9 | 3.9 |
| TL= | 32.7567 | 30.0591 | 36.8413 |
| Bf= | 0.6000 | 0.6000 | 0.6000 |
| d4= | 13.0216 | 4.9599 | 0.9095 |
| d12= | 4.6767 | 10.0409 | 20.8735 |
| d14= | 1.7484 | 1.7484 | 1.7484 |

[Lens Group Data]

| Group | I | focal length |
|---|---|---|
| 1 | 1 | −11.00 |
| 2 | 6 | 9.30 |
| 3 | 13 | 20.90 |

TABLE 6-continued

[Values for Conditional Expressions]

Figure 15A:
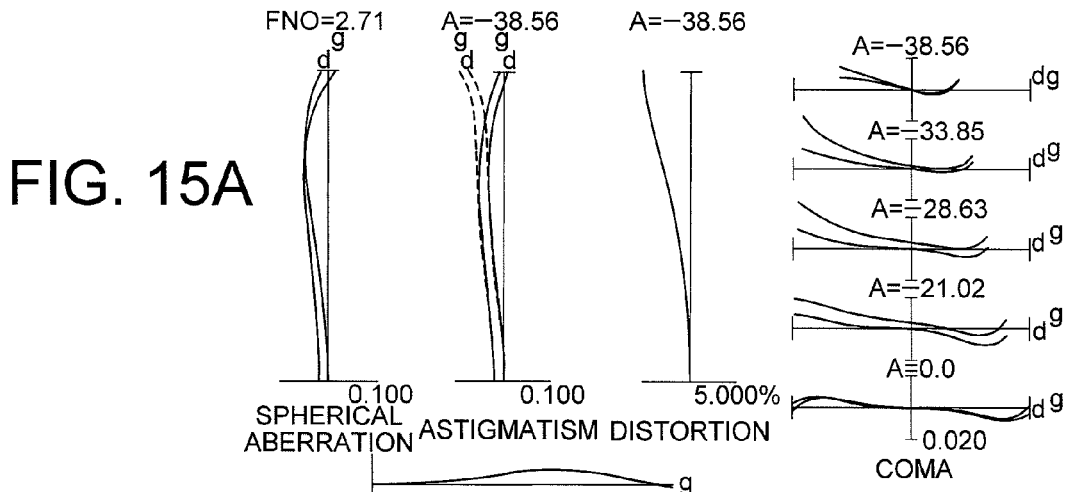
FIG. 15A is graphs showing various aberrations of the zoom lens according to the third example of the second embodiment in a wide-angle end state upon focusing on infinity.
Figure 15B:
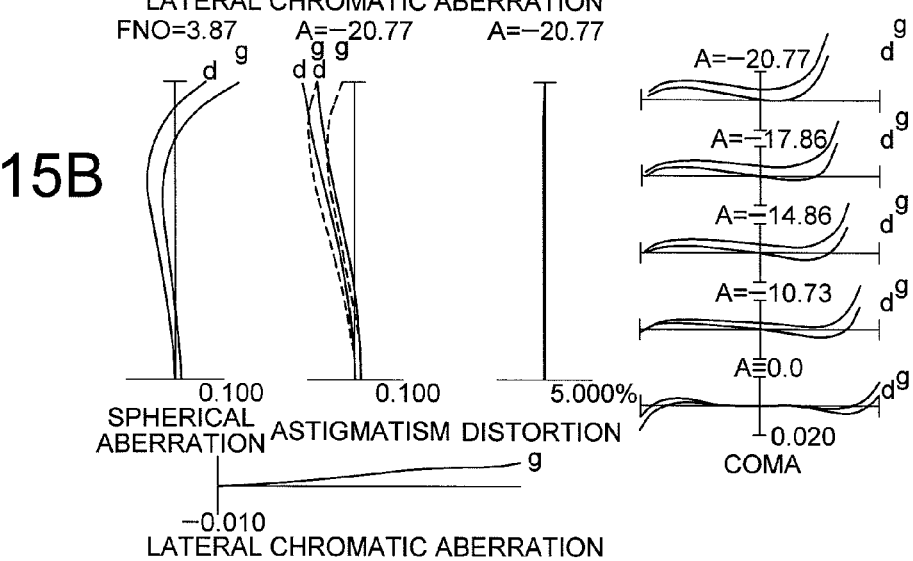
FIG. 15B is graphs showing various aberrations of the zoom lens according to the third example of the second embodiment in an intermediate focal length state upon focusing on infinity.
Figure 15C:
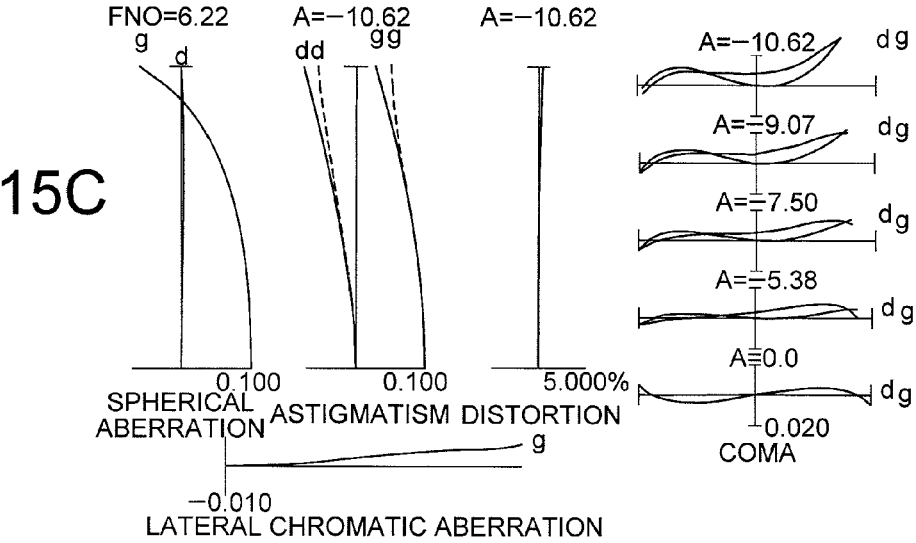
FIG. 15C is graphs showing various aberrations of the zoom lens according to the third example of the second embodiment in a telephoto end state upon focusing on infinity.

(7) $f2 \cdot TLt/ft^2 = 0.7996$
(8) $ft \cdot Ymax/f1^2 = 0.6672$
(9) $f2/(fw \cdot ft)^{1/2} = 0.9007$
(10) $(Nnav - 1.50) \, fw/TLw = 0.0633$
(11) $(R32 + R31)/(R32 - R31) = 0.3265$ FIG. 15A is graphs showing various aberrations of the zoom lens according to Example 2-3 of the second embodiment in a wide-angle end state upon focusing on infinity. FIG. 15B is graphs showing various aberrations of the zoom lens according to Example 2-3 of the second embodiment in an intermediate focal length state upon focusing on infinity. FIG. 15C is graphs showing various aberrations of the zoom lens according to Example 2-3 of the second embodiment in a telephoto end state upon focusing on infinity.

As is apparent from the respective graphs, the zoom lens ZL according to Example 2-3 of the second embodiment shows superb optical performance as a result of good corrections to various aberrations from the wide-angle end state through the telephoto end state.

Example 2-4

Figure 16:
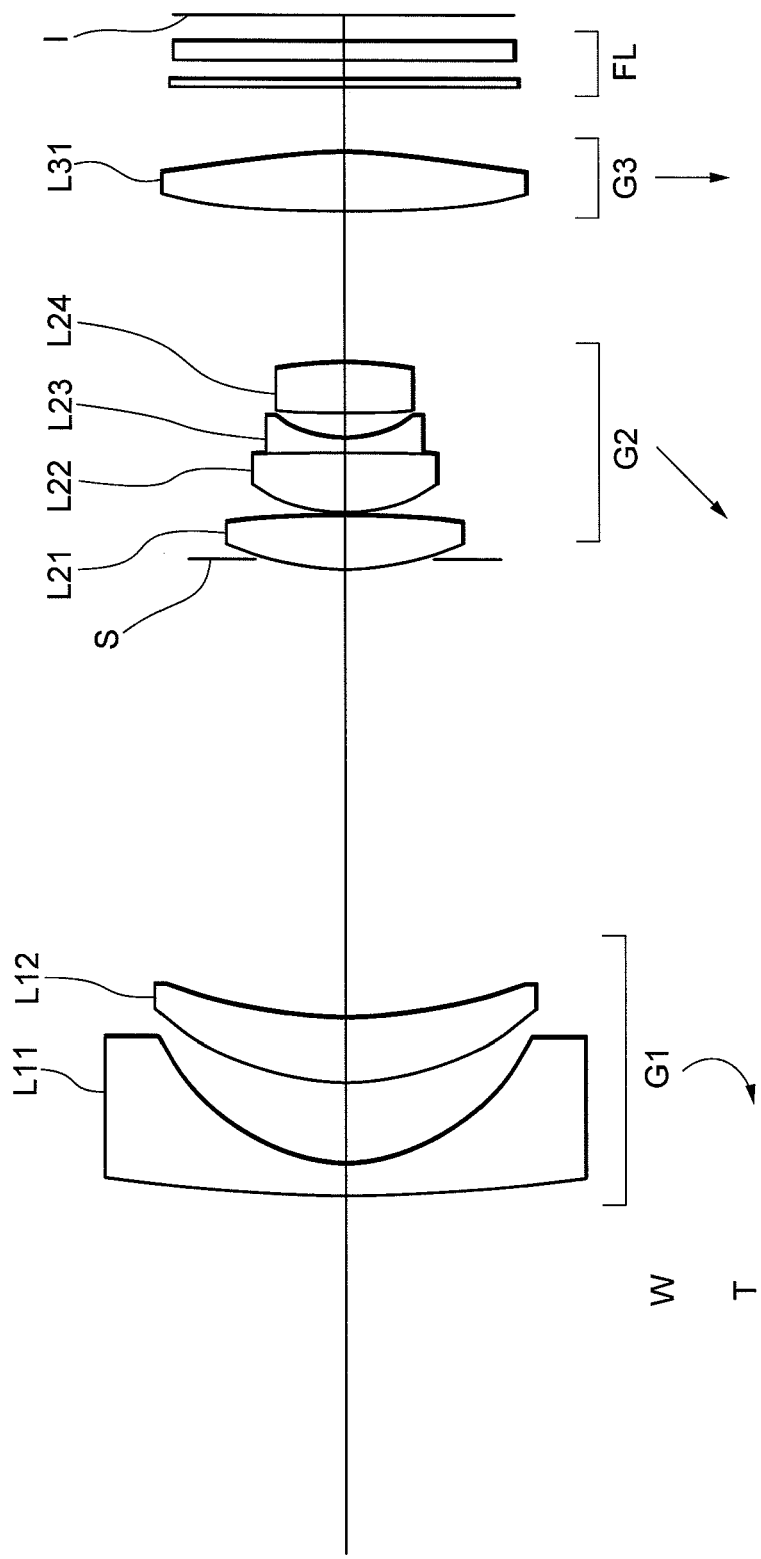
FIG. 16 is a sectional view showing a lens configuration of a zoom lens according to a fourth example of the second embodiment.

FIG. 16 is a sectional view showing a lens configuration of a zoom lens according to Example 2-4 of the second embodiment.

The zoom lens according to Example 2-4 of the second embodiment is composed of, in order from an object side along an optical axis, a first lens group G1 having negative refractive power as a whole, a second lens group G2 having positive refractive power as a whole, and a third lens group G3 having positive refractive power as a whole. Upon zooming from a wide-angle end state W to a telephoto end state T, the first lens group G1 and the second lens group G2 are moved and the third lens group G3 is fixed in such a manner that a distance between the first lens group G1 and the second lens group G2 decreases, and a distance between the second lens group G2 and the third lens group G3 increases.

The first lens group G1 is composed of, in order from the object side along the optical axis, a negative lens L11 and a positive lens L12. Each of the object side surface and the image side surface of the negative lens L11 is an aspherical surface.

The second lens group G2 is composed of, in order from the object side along the optical axis, a positive lens L21, a positive lens L22, a negative lens L23, and a positive lens L24, and the positive lens L22 and the negative lens L23 are cemented with each other, and each of the object side surface and the image side surface of the positive lens L21 is an aspherical surface.

The third lens group is composed of only one positive lens L31.

Moreover, an f-number defining member S is disposed to the image plane I side of a vertex on the optical axis of the positive lens L21 in the second lens group G2, and moved in a body with the second lens group G2 upon zooming from the wide-angle end state W to the telephoto end state T.

A filter group FL is composed of a low-pass filter, an infrared-light-blocking filter, and the like.

Various values associated with a zoom lens according Example 2-4 of the second embodiment are listed in Table 7.

TABLE 7

[Surface Data]

| i | r | d | nd | vd |
|---|---|---|---|---|
| OBJECT | ∞ | ∞ | | |
| 1* | 26.2538 | 0.8500 | 1.80139 | 45.46 |
| 2* | 4.3286 | 2.1500 | | |
| 3 | 7.5944 | 1.7000 | 1.80810 | 22.76 |
| 4 | 13.4684 | (variable) | | |
| 5 | ∞ | −0.3000 | f-number defining member S | |
| 6* | 6.8702 | 1.4000 | 1.78676 | 45.19 |
| 7* | −76.9268 | 0.1000 | | |
| 8 | 4.2920 | 1.5500 | 1.75500 | 52.29 |
| 9 | 256.2211 | 0.4000 | 2.00330 | 28.27 |
| 10 | 3.0782 | 0.7000 | | |
| 11 | 23.8551 | 1.3000 | 1.51823 | 58.89 |
| 12 | −19.8265 | (variable) | | |
| 13 | 23.9086 | 1.5500 | 1.62299 | 58.22 |
| 14 | −24.0828 | (variable) | | |
| 15 | ∞ | 0.2100 | 1.51680 | 64.12 |
| 16 | ∞ | 0.5000 | | |
| 17 | ∞ | 0.5000 | 1.51680 | 64.12 |
| 18 | ∞ | (Bf) | | |
| Image | ∞ | | | |

[Aspherical Surface Data]

Surface Number: 1

κ = 99.0000         A4 = 1.02420−04
A6 = −7.92430E−07   A8 = 0.00000E+00
A10 = 0.00000E+00

Surface Number: 2

κ = 0.0075          A4 = 5.06010E−05
A6 = 4.51090E−05    A8 = −1.493300E−06
A10 = 2.74750E−08

Surface Number: 6

κ = 3.3078          A4 = 1.43800E−03
A6 = −9.73010E−05   A8 = 0.00000E+00
A10 = 0.00000E+00

Surface Number: 7

κ = 99.0000         A4 = −1.14200E−04
A6 = −6.81790E−05   A8 = 0.00000E+00
A10 = 0.00000E+00

[Various Data]

Zoom Ration = 4.0194

| | W | M | T |
|---|---|---|---|
| f= | 5.15 | 10.30 | 20.70 |
| FNO= | 2.63 | 3.79 | 6.14 |
| ω= | 39.71 | 20.88 | 10.68 |
| Y= | 3.9 | 3.9 | 3.9 |
| TL= | 31.1335 | 28.7711 | 35.5058 |
| Bf= | 0.6000 | 0.6000 | 0.6000 |
| d4= | 12.2042 | 4.6199 | 0.8094 |
| d12= | 3.9753 | 9.1972 | 19.7425 |
| d14= | 1.7440 | 1.7440 | 1.7440 |

[Lens Group Data]

| Group | I | focal length |
|---|---|---|
| 1 | 1 | −10.90 |
| 2 | 6 | 8.90 |
| 3 | 13 | 19.50 |

[Values for Conditional Expressions]

(7) $f2 \cdot TLt/ft^2 = 0.7375$
(8) $ft \cdot Ymax/f1^2 = 0.6795$
(9) $f2/(fw \cdot ft)^{1/2} = 0.8620$ TABLE 7-continued

(10) (Nnav − 1.50) fw/TLw = 0.0666
(11) (R32 + R31)/(R32 − R31) = 0.0036

Figure 17A:
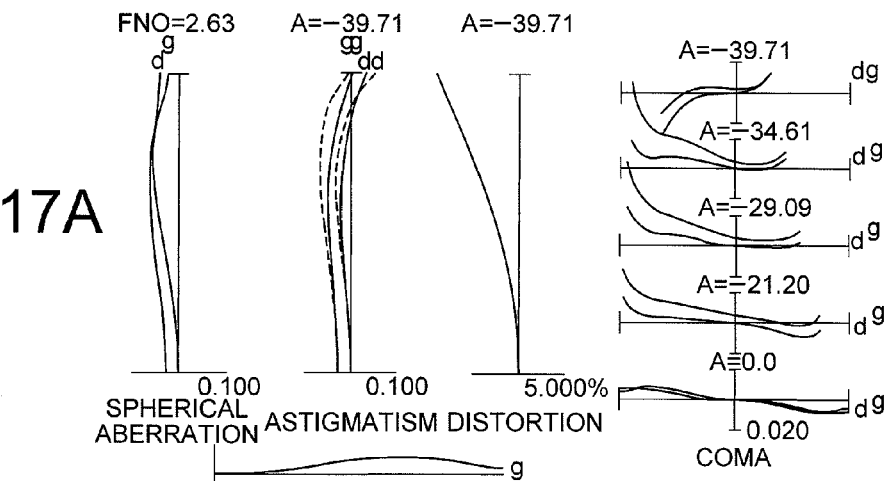
FIG. 17A is graphs showing various aberrations of the zoom lens according to the fourth example of the second embodiment in a wide-angle end state upon focusing on infinity.
Figure 17B:
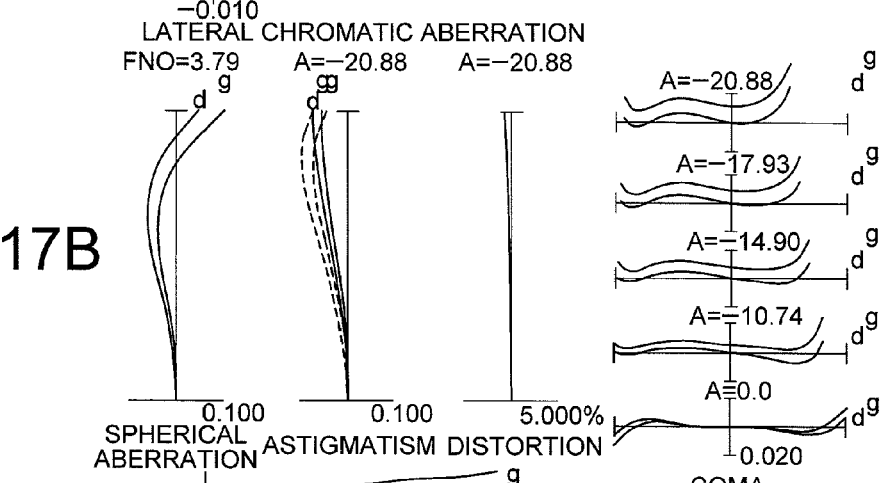
FIG. 17B is graphs showing various aberrations of the zoom lens according to the fourth example of the second embodiment in an intermediate focal length state upon focusing on infinity.
Figure 17C:
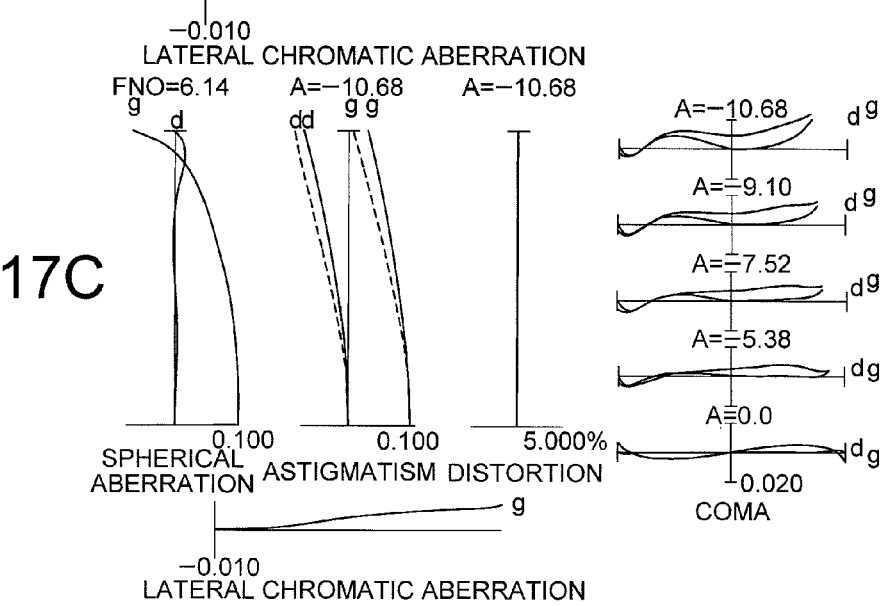
FIG. 17C is graphs showing various aberrations of the zoom lens according to the fourth example of the second embodiment in a telephoto end state upon focusing on infinity.

FIG. 17A is graphs showing various aberrations of the zoom lens according to Example 2-4 of the second embodiment in a wide-angle end state upon focusing on infinity. FIG. 17B is graphs showing various aberrations of the zoom lens according to Example 2-4 of the second embodiment in an intermediate focal length state upon focusing on infinity. FIG. 17C is graphs showing various aberrations of the zoom lens according to Example 2-4 of the second embodiment in a telephoto end state upon focusing on infinity.

As is apparent from the respective graphs, the zoom lens ZL according to Example 2-4 of the second embodiment shows superb optical performance as a result of good corrections to various aberrations from the wide-angle end state through the telephoto end state.

The second embodiment makes it possible to provide a downsized zoom lens having excellent optical performance with a wide angle of view and a high zoom ratio suitable for a solid-state imaging device.

Then, a camera equipped with a zoom lens according to the second embodiment of the present application is explained. Although a case that the zoom lens according to Example 2-1 of the second embodiment is installed is explained, a case that a zoom lens according to any other Example is installed is the same.

Figure 18A:
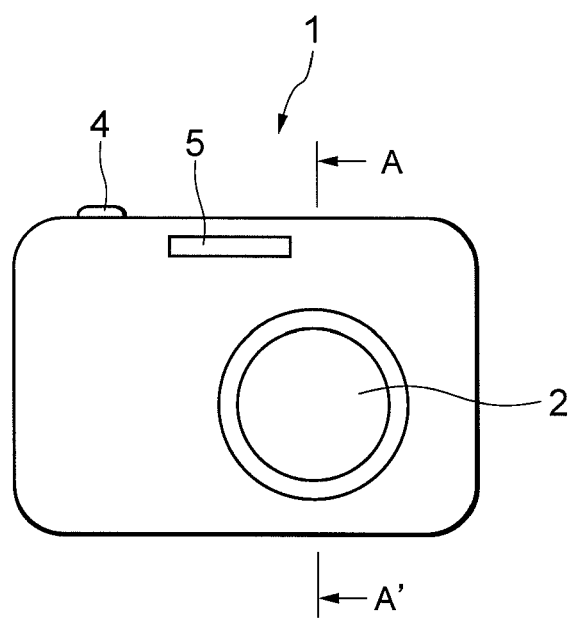
FIG. 18A is a front view of a digital still camera according to the second embodiment.
Figure 18B:
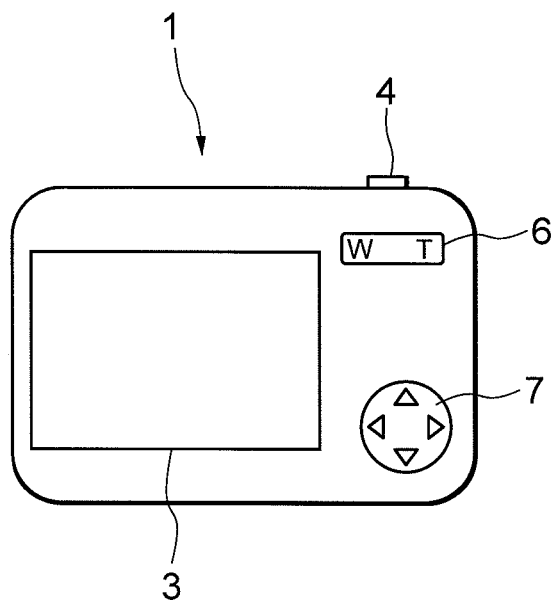
FIG. 18B is a rear view of a digital still camera according to the second embodiment.
Figure 19:
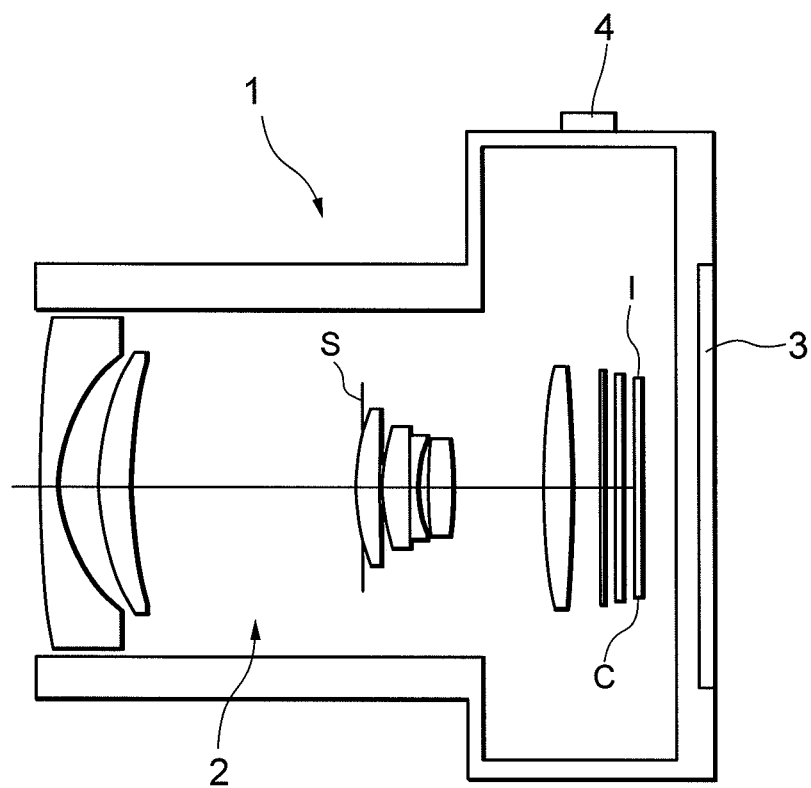
FIG. 19 is a sectional view along an arrow A-A' shown in FIG. 18A.

FIG. 18A is a front view of an electronic still camera equipped with the zoom lens according to Example 2-1 of the second embodiment. FIG. 18B is a rear view of an electronic still camera equipped with the zoom lens according to Example 2-1 of the second embodiment. FIG. 19 is a sectional view along an arrow A-A' shown in FIG. 18A.

In the electronic still camera 1 shown in FIGS. 18A through 18C and 19, when a power switch button (not shown) is pressed, a shutter (not shown) of an image-taking lens 2, which is the zoom lens according to Example 2-1 of the second embodiment, is opened, light from an object (not shown) is converged by the image-taking lens 2, and an image is formed on an imaging device C (such as a CCD, or CMOS) disposed on the image plane I. The object image formed on the imaging device C is displayed on a liquid crystal monitor 3 disposed backside of the electronic still camera 1. After fixing the image composition of the object image with observing the liquid crystal monitor 3, a photographer depresses a release button 4 to take a picture of the object image by the imaging device C, and stores in a memory (not shown).

In the electronic still camera 1, the following members are disposed such as an auxiliary light emitter 5 that emits auxiliary light when the object is dark, a W-T button 6 that makes the zoom lens 2, which is the image-taking lens 2, carry out zooming between a wide-angle end state (W) and a telephoto end state (T), and a function button 7 that is used for setting various conditions of the electronic still camera 1.

Moreover, in the electronic still camera 1 according to the second embodiment, the image-taking lens 2 is equipped with a vibration reduction function capable of carrying out correction of an image blur.

Then, an outline of a method for manufacturing a zoom lens according to the second embodiment is explained with reference to FIG. 20. A method for manufacturing a zoom lens according to the second embodiment shown in FIG. 20 is a method for manufacturing a zoom lens including, in order from an object side, a first lens group, a second lens group and a third lens group, the method comprising steps of: disposing each lens into a lens barrel having a cylindrical shape in such a manner that the first lens group has negative refractive power, the second lens group has positive refractive power, and the third lens group has positive refractive power (Step S201); and disposing each lens in such a manner that upon zooming from a wide-angle end state to a telephoto end state, a distance between the first lens group and the second lens group varies, and a distance between the second lens group and the third lens group varies, and the following conditional expressions (7) and (8) are satisfied (Step S202):

$$0.65 < f2 \cdot TLt/ft^2 < 0.92 \qquad (7)$$

$$0.63 < ft \cdot Ymax/f1^2 < 0.80 \qquad (8)$$

where f2 denotes a focal length of the second lens group, TLt denotes a total lens length of the zoom lens in the telephoto end state, ft denotes a focal length of the zoom lens in the telephoto end state, Ymax denotes the maximum image height, and f1 denotes a focal length of the first lens group.

As described above, the second embodiment makes it possible to provide a method for manufacturing a downsized zoom lens having excellent optical performance with a wide angle of view and a high zoom ratio suitable for a solid-state imaging device.

Then, the following description may suitably be applied within limits that do not deteriorate optical performance.

In each Example of the second embodiment, although lens systems having a three-lens-group configuration has been shown, the above described lens configuration can be applied to other lens configurations such as a four-lens-group configuration and a five-lens-group configuration. In particular, a lens configuration in which a lens or a lens group is added to the most object side, and a lens configuration in which a lens or a lens group is added to the most image side may be possible. Incidentally, a lens group is at least one lens that is separated by air spaces, which vary upon zooming.

In order to vary focusing from an infinity object to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that the third lens group is moved as the focusing lens group.

Moreover, a lens group or a portion of a lens group may be moved as a vibration reduction lens group in a direction including a component perpendicular to the optical axis, or tilted (swayed) on a plane including the optical axis thereby correcting an image blur caused by a camera shake. In particular, at least a portion of the second lens group is preferably made as the vibration reduction lens group.

Any lens surface may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Although an aperture stop is preferably disposed in the vicinity of the second lens group, the function may be substituted by a lens frame without disposing a member as an aperture stop.

Moreover, the lens surface of the lenses configuring the lens system may be coated with an anti-reflection film having a high transmittance in a broad wave range. With this contrivance, it is feasible to attain the high contrast and the high optical performance by reducing a flare and ghost.

In the zoom lens according to the second embodiment, the zoom ratio is about 3.5 to 4.5. The zoom ratio is preferably about 3.7 to 4.3.

In a zoom lens according to the second embodiment, the first lens group G1 preferably includes one positive lens element and one negative lens element. In this instance, these lens elements are preferably disposed in the first lens group G1, in order from the object side, the negative lens element and the positive lens element with an air space in between.

Moreover, in a zoom lens according to the second embodiment, the second lens group G2 preferably includes two positive lens elements or more and one negative lens element or more. In this instance, these lens elements are preferably disposed in the second lens group G2, in order from the object side, a positive lens element, a negative lens element and a positive lens element with an air space disposing between adjoining elements.

Furthermore, in a zoom lens according to the second embodiment, the third lens group G3 preferably includes one positive lens element.

The present embodiment only shows a specific example for the purpose of better understanding of the present application. Accordingly, it is needless to say that the present application in its broader aspect is not limited to the specific details and representative devices.

What is claimed is:

1. A zoom lens comprising, in order from an object side along an optical axis:
   a first lens group having negative refractive power;
   a second lens group having positive refractive power; and
   a third lens group having positive refractive power;
   upon zooming from a wide-angle end state to a telephoto end state, a distance between the first lens group and the second lens group varying, and a distance between the second lens group and the third lens group varying, and the following conditional expression being satisfied:

$2.70 < (ft^2 \times Dw23)/(fw^2 \times TLw) < 4.0$ where fw denotes a focal length of the zoom lens in a wide-angle end state, Dw23 denotes a distance between the second lens group and the third lens group in the wide-angle end state, ft denotes a focal length of the zoom lens in the telephoto end state, and TLw denotes a total lens length of the zoom lens in the wide-angle end state.

2. The zoom lens according to claim 1, wherein the following conditional expression is satisfied:

$1.9 < ft/(-f1) < 2.3$ where f1 denotes a focal length of the first lens group.

3. The zoom lens according to claim 1, wherein the following conditional expression is satisfied:

$1.7 < (fw \times TLw)/(ft \times Ymax) < 2.0$ where Ymax denotes the maximum image height of the zoom lens.

4. The zoom lens according to claim 1, wherein the following conditional expression is satisfied:

$3.15 < Ndn + (0.05 \times vdn) < 3.60$ where Ndn denotes a refractive index at d-line of a negative lens having highest refractive index at d-line in the second lens group, and vdn denotes an Abbe number of the negative lens.

5. The zoom lens according to claim 1, wherein the following conditional expression is satisfied:

$1.8 < Ndn < 2.5$ where Ndn denotes a refractive index at d-line of a negative lens having highest refractive index at d-line in the second lens group.

6. The zoom lens according to claim 1, wherein the third lens group is constructed by a single positive lens, and the following conditional expression is satisfied:

$-0.4 < (Rb+Ra)/(Rb-Ra) < 1.0$ where Ra denotes a radius of curvature of the object side surface of the positive lens, and Rb denotes a radius of curvature of the image side surface of the positive lens.

7. The zoom lens according to claim 1, wherein at least the first lens group and the second lens group are moved such that upon zooming from a wide-angle end state to a telephoto end state, a distance between the first lens group and the second lens group decreases, and a distance between the second lens group and third lens group increases.

8. The zoom lens according to claim 1, wherein the first lens group consists of, in order from the object side along the optical axis, a negative lens and a positive lens.

9. The zoom lens according to claim 1, wherein the first lens group includes, in order from the object side along the optical axis, a negative lens and a positive lens.

10. The zoom lens according to claim 1, wherein the most object side lens in the first lens group has an aspherical surface.

11. The zoom lens according to claim 1, wherein the second lens group includes, in order from the object side along the optical axis, two positive lenses and one negative lens.

12. The zoom lens according to claim 1, wherein the second lens group includes, in order from the object side along the optical axis, one positive lens and one negative lens.

13. The zoom lens according to claim 1, wherein the second lens group consists of, in order from the object side along the optical axis, two positive lenses, one negative lens, and one positive lens.

14. The zoom lens according to claim 1, wherein the most object side lens in the second lens group has an aspherical surface.

15. The zoom lens according to claim 1, wherein the third lens group is fixed to the optical axis upon zooming from the wide-angle end state to the telephoto end state.

16. The zoom lens according to claim 1, wherein the most object side lens in the first lens group is a meniscus lens having a convex surface facing the object side.

17. An optical apparatus equipped with the zoom lens according to claim 1 that forms a given image of the object.

18. A zoom lens comprising, in order from an object side along an optical axis:
   a first lens group having negative refractive power;
   a second lens group having positive refractive power; and
   a third lens group having positive refractive power;
   upon zooming from a wide-angle end state to a telephoto end state, a distance between the first lens group and the second lens group varying, and a distance between the second lens group and the third lens group varying, and the following conditional expressions being satisfied:

$$0.65 < f2 \cdot TLt/ft^2 < 0.92$$

$$0.63 < ft \cdot Ymax/f1^2 < 0.80$$

where f2 denotes a focal length of the second lens group, TLt denotes a total lens length of the zoom lens in the telephoto end state, ft denotes a focal length of the zoom lens in the telephoto end state, Ymax denotes the maximum image height, and f1 denotes a focal length of the first lens group.

19. The zoom lens according to claim 18, wherein the following conditional expression is satisfied:

$$0.85 < f2/(fw \cdot ft)^{1/2} < 0.95$$

where fw denotes a focal length of the zoom lens in the wide-angle end state.

20. The zoom lens according to claim 18, wherein the following conditional expression is satisfied:

$$0.055 < (Nnav - 1.50) fw/TLw < 0.150$$

where Nnav denotes an average of a refractive index at d-line (wavelength λ=587.6nm) of all negative lenses included in the zoom lens, fw denotes a focal length of the zoom lens in the wide-angle end state, TLw denotes a total lens length of the zoom lens in the wide-angle end state.

21. The zoom lens according to claim 18, wherein the third lens group consists of only one positive lens, and the following conditional expression is satisfied:

$$-0.30 < (R32 + R31)/(R32 - R31) < 1.10$$

where R31 denotes a paraxial radius of curvature of the object side lens surface of the positive lens in the third lens group, and R32 denotes a paraxial radius of curvature of the image side lens surface of the positive lens in the third lens group.

22. The zoom lens according to claim 18, wherein the first lens group includes, in order from the object side along the optical axis, at least one negative lens and one positive lens.

23. The zoom lens according to claim 18, wherein the most object side lens surface in the second lens group is an aspherical surface.

24. An optical apparatus equipped with the zoom lens according to claim 18.

25. A method for manufacturing a zoom lens including a first lens group, a second lens group, and a third lens group, comprising steps of:
disposing each lens in such a manner that the first lens group has negative refractive power, the second lens group has positive refractive power, and the third lens group has positive refractive power;
disposing the first lens group, the second lens group and the third lens group in such a manner that upon zooming from a wide-angle end state to a telephoto end state, a distance between the first lens group and the second lens group varies, and a distance between the second lens group and the third lens group varies, and the following conditional expression is satisfied:

$$2.70 < (ft^2 \times Dw23)/(fw^2 \times TLw) < 4.0$$

where fw denotes a focal length of the zoom lens in a wide-angle end state, Dw23 denotes a distance between the second lens group and the third lens group in the wide-angle end state, ft denotes a focal length of the zoom lens in the telephoto end state, and TLw denotes a total lens length of the zoom lens in the wide-angle end state.

26. The method according to claim 25, further comprising a step of:
disposing each lens with satisfying the following conditional expression:

$$1.9 < ft/(-f1) < 2.3$$

where f1 denotes a focal length of the first lens group.

27. The method according to claim 25, further comprising a step of:
disposing each lens with satisfying the following conditional expression:

$$1.7 < (fw \times TLw)/(ft \times Ymax) < 2.0$$

where Ymax denotes the maximum image height of the zoom lens.

28. A method for manufacturing a zoom lens including a first lens group, a second lens group, and a third lens group, comprising steps of:
disposing each lens in such a manner that the first lens group has negative refractive power, the second lens group has positive refractive power, and the third lens group has positive refractive power;
disposing the first lens group, the second lens group and the third lens group in such a manner that upon zooming from a wide-angle end state to a telephoto end state, a distance between the first lens group and the second lens group varies, and a distance between the second lens group and the third lens group varies, and the following conditional expressions are satisfied:

$$0.65 < f2 \cdot TLt/ft^2 < 0.92$$

$$0.63 < ft \cdot Ymax/f1^2 < 0.80$$

where f2 denotes a focal length of the second lens group, TLt denotes a total lens length of the zoom lens in the telephoto end state, ft denotes a focal length of the zoom lens in the telephoto end state, Ymax denotes the maximum image height, and f1 denotes a focal length of the first lens group.

29. The method according to claim 28, further comprising a step of:
disposing each lens with satisfying the following conditional expression:

$$0.85 < f2/(fw \cdot ft)^{1/2} < 0.95$$

where fw denotes a focal length of the zoom lens in the wide-angle end state.

30. The method according to claim 28, further comprising a step of:
disposing each lens with satisfying the following conditional expression:

$$0.055 < (Nnav - 1.50) fw/TLw < 0.150$$

where Nnav denotes an average of a refractive index at d-line (wavelength λ=587.6 nm) of all negative lenses included in the zoom lens, fw denotes a focal length of the zoom lens in the wide-angle end state, TLw denotes a total lens length of the zoom lens in the wide-angle end state.

* * * * *